US012578948B2

(12) United States Patent　　　(10) Patent No.:　US 12,578,948 B2

Ni et al.　　　(45) Date of Patent:　Mar. 17, 2026

(54) VEHICLE SOFTWARE UPGRADE METHOD AND RELATED SYSTEM

(71) Applicant: Shenzhen Yinwang Intelligent Technologies Co., Ltd., Shenzhen (CN)

(72) Inventors: Guoyu Ni, Shanghai (CN); Qinglun Yue, Shanghai (CN); Junyang Xie, Shanghai (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 135 days.

(21) Appl. No.: 17/947,394

(22) Filed: Sep. 19, 2022

(65) Prior Publication Data

US 2023/0021129 A1　　Jan. 19, 2023

Related U.S. Application Data

(63) Continuation of application No. PCT/CN2020/080146, filed on Mar. 19, 2020.

(51) Int. Cl.
　　*G06F 8/65*　　　(2018.01)
　　*G06F 8/71*　　　(2018.01)
　　*H04L 67/12*　　(2022.01)
(52) U.S. Cl.
　　CPC .................. *G06F 8/65* (2013.01); *G06F 8/71* (2013.01); *H04L 67/12* (2013.01)
(58) Field of Classification Search
　　CPC .............. G06F 8/65; G06F 8/71; H04L 67/12
　　See application file for complete search history.

(56) References Cited

U.S. PATENT DOCUMENTS

2008/0140278 A1*　6/2008　Breed .................... G07C 5/008
　　　　　　　　　　　　　　　　　　　　　701/1
2014/0237462 A1*　8/2014　Zheng ....................... G06F 8/65
　　　　　　　　　　　　　　　　　　　　　717/170

(Continued)

FOREIGN PATENT DOCUMENTS

CN　　104980915 A　　10/2015
CN　　105208112 A　　12/2015

(Continued)

OTHER PUBLICATIONS

Xpeng Motors, "You can upgrade without going to a 4S store, how can OTA technology become a new favorite of smart cars?," Jul. 12, 2016, with an English machine translation, 9 pages.

*Primary Examiner* — Lewis A Bullock, Jr.
*Assistant Examiner* — Theodore E Hebert
(74) *Attorney, Agent, or Firm* — Conley Rose, P.C.

(57)　　　　　ABSTRACT

A vehicle software upgrade method for obtaining a to-be-upgraded software version of a vehicle. When a vehicle performs the software upgrade method, the vehicle determines a current location of the vehicle, and determines whether the vehicle is located within a rescue range of a service site. Then, the vehicle sends, to the cloud server, information that includes a determining result and a to-be-upgraded version of software currently installed on the vehicle. The cloud server pushes to the vehicle, based on the obtained information, an installation package type corresponding to the to-be-upgraded software version. Then, the vehicle determines, how to perform upgrade.

20 Claims, 9 Drawing Sheets

(56)                References Cited

U.S. PATENT DOCUMENTS

| | | | | |
|---|---|---|---|---|
| 2014/0237465 A1* | 8/2014 | Lin | ......................... | G06F 8/656 |
| | | | | 717/173 |
| 2015/0089489 A1* | 3/2015 | Sarkar | .................... | H04L 67/12 |
| | | | | 717/173 |
| 2015/0169311 A1* | 6/2015 | Dickerson | ................ | G06F 8/65 |
| | | | | 717/170 |
| 2015/0178067 A1 | 6/2015 | Ji | | |
| 2015/0355893 A1* | 12/2015 | Luk | ......................... | G06F 21/60 |
| | | | | 717/178 |
| 2017/0242679 A1 | 8/2017 | Sangameswaran et al. | | |
| 2018/0024826 A1* | 1/2018 | Caushi | ..................... | G06F 8/65 |
| | | | | 717/172 |
| 2018/0107473 A1* | 4/2018 | Ahmed | ................... | G06F 8/654 |
| 2018/0150290 A1 | 5/2018 | Matsuda | | |
| 2019/0075423 A1* | 3/2019 | Hrabak | ................. | H04W 76/14 |
| 2019/0102164 A1* | 4/2019 | Gur | ......................... | G06F 8/658 |
| 2019/0163461 A1* | 5/2019 | Jayaraman | ................ | G06F 8/65 |
| 2019/0259223 A1* | 8/2019 | Sangameswaran | .. | G07C 5/0841 |

| | | | | |
|---|---|---|---|---|
| 2020/0293658 A1* | 9/2020 | Krishna Murthy | ... | H04L 67/125 |
| 2020/0394031 A1* | 12/2020 | Kim | ......................... | G06F 8/65 |
| 2021/0191714 A1* | 6/2021 | Ullman | ............... | G06F 11/0739 |

FOREIGN PATENT DOCUMENTS

| | | |
|---|---|---|
| CN | 105897480 A | 8/2016 |
| CN | 107402847 A | 11/2017 |
| CN | 107493186 A | 12/2017 |
| CN | 109298881 A | 2/2019 |
| CN | 109429172 A | 3/2019 |
| CN | 110162323 A | 8/2019 |
| CN | 110187900 A | 8/2019 |
| CN | 110430237 A | 11/2019 |
| CN | 110457057 A | 11/2019 |
| CN | 110471680 A | 11/2019 |
| CN | 110750279 A | 2/2020 |
| DE | 102018220976 A1 | 6/2019 |
| JP | 2010282385 A | 12/2010 |
| JP | 2016218932 A | 12/2016 |

* cited by examiner

VEHICLE SOFTWARE UPGRADE METHOD AND RELATED SYSTEM

CROSS-REFERENCE TO RELATED APPLICATIONS

This application is a continuation of International Patent Application No. PCT/CN2020/080146, filed on Mar. 19, 2020, the disclosure of which is hereby incorporated by reference in its entirety.

TECHNICAL FIELD

The present disclosure relates to the data processing field, and in particular, to a vehicle software upgrade method and a related system.

BACKGROUND

Currently, a vehicle (e.g., an automobile) is increasingly software-based, and consequently has an increasingly large amount of software code in the vehicle. Because software has a feature of being updated for a plurality of times without changing hardware (e.g., repairing a software defect or adding a function or feature), a demand for software upgrade to the vehicle is also increasing. A common software upgrade method is local upgrade. For example, a user drives a vehicle to a sale, spare part, service, and survey (4S) shop for software upgrade. However, with emergence of intelligent vehicles, remote upgrade (e.g., over-the-air (OTA)) becomes increasingly popular, and a service scope of the remote upgrade becomes wider. For example, in an early phase, the OTA is limited only to upgrading a central console entertainment system of a vehicle, and gradually the OTA can upgrade a related component of each electronic control unit (ECU) of the entire vehicle.

There is no limitation on time and a location for upgrading a vehicle by using OTA, that is, the vehicle can be upgraded anytime and anywhere. This greatly facilitates vehicle management (e.g., resolving a disadvantage in a current software version and adding a new function) performed by an automotive enterprise. However, because OTA upgrade can be performed anytime and anywhere, a location of a vehicle is uncertain when the OTA upgrade is performed on the vehicle. To facilitate timely rescue when a vehicle is out of service due to an OTA upgrade failure, currently, some automobile enterprises obtain real-time location information of a vehicle while delivering a software upgrade version to the vehicle through a cloud server of the automotive enterprises. This OTA upgrade manner of obtaining real-time location information of a vehicle increases a risk of user privacy leakage.

SUMMARY

Embodiments of the present disclosure provide a vehicle software upgrade method and a related system, so that a vehicle determines, based on a location of the vehicle, whether the vehicle is located within a rescue range, and accordingly determines whether to upgrade a software version. This method does not cause leakage of real-time location information of the vehicle and protects user privacy compared with a conventional OTA upgrade manner.

Based on this, according to a first aspect, an embodiment of the present disclosure provides a vehicle software upgrade method, and the method includes:

First, a vehicle obtains a rescue range of a service site and a current location of the vehicle. The service site may be specifically one or more entity platforms for providing a rescue service (which may also be referred to as having a rescue capability) for the vehicle or another vehicle whose software fails to be upgraded, for example, 4S shops and/or vehicle maintenance centers. For example, the service site is a 4S shop. The rescue range of the service site described in the present disclosure is a set of areas that can be covered by rescue services provided by the 4S shops. Then, the vehicle further determines, based on a location of the vehicle, whether the vehicle is located within the rescue range including the foregoing service sites. If the vehicle determines, based on the current location of the vehicle, that the vehicle is located within the rescue range, the vehicle sends information about to-be-upgraded software of the vehicle to a cloud server. The information about the to-be-upgraded software is used to indicate to the cloud server to search for a to-be-upgraded installation package of the to-be-upgraded software based on the information about the to-be-upgraded software. Then, the vehicle receives the to-be-upgraded installation package sent by the cloud server, and performs version upgrade based on the to-be-upgraded installation package.

In the foregoing implementation of the present disclosure, when a vehicle needs to perform version upgrade, the vehicle first obtains a rescue range of each service site, determines a current location of the vehicle, and determines whether the vehicle is located within the rescue range of each service site (the rescue range of each service site may be delivered by a cloud server or stored by the vehicle). If the vehicle is located within the rescue range, the vehicle sends information about to-be-upgraded software of the vehicle to the cloud server. The cloud server determines to push to the vehicle, based on the information, an installation package type corresponding to a to-be-upgraded software version. Then, the vehicle determines, based on the obtained installation package type, how to perform upgrade. This method does not cause leakage of real-time location information of the vehicle compared with a conventional OTA software upgrade manner.

With reference to the first aspect of the embodiment of the present disclosure, in a first implementation of the first aspect of the embodiment of the present disclosure, that the vehicle sends information about to-be-upgraded software of the vehicle to the cloud server may be specifically: sending, to the cloud server, the information about the to-be-upgraded software of the vehicle and first information indicating that the vehicle is located within the rescue range of each service site. The first information is used to indicate to the cloud server to select a to-be-upgraded installation package of a differential version type based on the first information.

In the foregoing implementation of the present disclosure, in addition to sending the information about the to-be-upgraded software of the vehicle to the cloud server, the vehicle further sends the first information to the cloud server, so that the cloud server can send an installation package of a differential version type to the vehicle based on the first information. This is because the differential version has a small data amount, so that an amount of data sent by the cloud server to the vehicle is reduced. However, an upgrade failure rate of the differential version is higher than that of a full version. Since the vehicle is located within the rescue range at the time, the vehicle can be rescued in time even if the upgrade fails. In this case, downloads are greatly reduced, and user experience is improved.

With reference to the first aspect of the embodiment of the present disclosure, in a second implementation of the first aspect of the embodiment of the present disclosure, when the current location of the vehicle is outside the rescue range of the service site, in addition to sending the information about the to-be-upgraded software of the vehicle to the cloud server, the vehicle further sends, to the cloud server, second information indicating that the vehicle is outside the rescue range. The information about the to-be-upgraded software is used to indicate to the cloud server to search for the to-be-upgraded installation package of the to-be-upgraded software based on the information about the to-be-upgraded software, and the second information is used to indicate to the cloud server to select a to-be-upgraded installation package of a full version type based on the second information.

In the foregoing implementation of the present disclosure, when the vehicle is outside the rescue range of the service site, in addition to sending the information about the to-be-upgraded software of the vehicle to the cloud server, the vehicle further sends the second information to the cloud server, so that the cloud server can send the to-be-upgraded installation package of the full version type to the vehicle based on the second information. This is because an upgrade failure rate of the full version is relatively low, but a data amount is large, memory is occupied, and downloading is slow. Since the vehicle is outside the rescue range at the time, to reduce the upgrade failure rate, the cloud server is selected to send the to-be-upgraded installation package of the full version to the vehicle.

With reference to the first aspect of the embodiment of the present disclosure, in a third implementation of the first aspect of the embodiment of the present disclosure, when the current location of the vehicle is outside the rescue range of the service site, the cloud server may not immediately send a to-be-upgraded installation package of a full version type of the to-be-upgraded software to the vehicle. The vehicle may first determine preset duration (which may be referred to as first preset duration), and the vehicle periodically determines, within the preset duration, whether the vehicle enters the rescue range. If the vehicle re-enters the rescue range within the first preset duration, the cloud server still pushes the to-be-upgraded installation package of the full version type to the vehicle. If the vehicle has entered the rescue range within the preset duration, the vehicle sends, to the cloud server, the information about the to-be-upgraded software of the vehicle and third information indicating that the vehicle has entered the rescue range within the preset duration. The information about the to-be-upgraded software is used to indicate to the cloud server to search for the to-be-upgraded installation package of the to-be-upgraded software based on the information about the to-be-upgraded software, the third information is used to indicate to the cloud server to select the to-be-upgraded installation package of the differential version type based on the third information. Then, the vehicle receives the to-be-upgraded installation package sent by the cloud server, and performs version upgrade based on the to-be-upgraded installation package.

In the foregoing implementation of the present disclosure, it is described in detail that buffer time (that is, the preset duration) may be provided for the vehicle when the vehicle is outside the rescue range. If the vehicle re-enters the rescue range within the preset duration, the vehicle sends, to the cloud server, the third information indicating that the vehicle has entered the rescue range within the preset duration, so that the cloud server sends a to-be-upgraded installation package of a differential version type to the vehicle based on the third information. In this manner, user experience is improved, and an actual application scenario is considered.

With reference to the third implementation of the first aspect of the embodiment of the present disclosure, in a fourth implementation of the first aspect of the embodiment of the present disclosure, before the vehicle periodically determines, within the first preset duration, whether the vehicle enters the rescue range, the vehicle may further first obtain a notification message. The notification message is used to indicate to the vehicle to periodically determine, within the preset duration, whether the vehicle has entered the rescue range. The notification message may be generated by the vehicle or may be sent by the cloud server. This is not specifically limited herein.

In the foregoing implementation of the present disclosure, a specific implementation of determining whether the vehicle re-enters the rescue range within the preset duration is described in detail, and can be implemented.

With reference to the third implementation and the fourth implementation of the first aspect of the embodiment of the present disclosure, in a fifth implementation of the first aspect of the embodiment of the present disclosure, the determining whether the vehicle re-enters the rescue range within the first preset duration may alternatively be as follows: The vehicle obtains a reminder message. The reminder message is used to remind the vehicle to enter the rescue range of the service site within the first preset duration. The reminder message may be generated by the vehicle or may be sent by the cloud server. This is not specifically limited herein.

In the foregoing implementation of the present disclosure, another specific implementation of determining whether the vehicle re-enters the rescue range within the preset duration is described in detail, and is selective.

With reference to the first aspect, or the first implementation to the fifth implementation of the first aspect of the embodiment of the present disclosure, in a sixth implementation of the first aspect of the embodiment of the present disclosure, a manner in which the vehicle obtains the rescue range of the service site may be as follows: The cloud server stores rescue ranges of all service sites that are in a preset region (e.g., a China region or a US region) and that can provide a rescue service for the vehicle. When the vehicle sends a request message to the cloud server, the cloud server sends the rescue ranges of all the service sites in the preset region to the vehicle in response to the request message.

With reference to the first aspect, or the first implementation to the sixth implementation of the first aspect of the embodiment of the present disclosure, in a seventh implementation of the first aspect of the embodiment of the present disclosure, a manner in which the vehicle obtains the rescue range of the service site may be further as follows: The rescue ranges of all the service sites that are in the preset region and that can provide a rescue service for the vehicle are sent by the cloud server to the vehicle in advance. When a specific quantity or a rescue range of service sites in the preset region changes, the cloud server sends updated information to the vehicle. When the vehicle needs to perform software upgrade, the vehicle directly obtains the rescue ranges of all the service sites in the preset region from a storage device of the vehicle.

In the foregoing implementations of the present disclosure, two different manners in which the vehicle obtains the rescue range of the service site are specifically described, and are flexible.

With reference to the first aspect, or the first implementation to the seventh implementation of the first aspect of the embodiment of the present disclosure, in an eighth implementation of the first aspect of the embodiment of the present disclosure, the vehicle may obtain the rescue range of the service site in a plurality of forms, and one of the implementations may be as follows: The rescue range of the service site is determined based on a location of the service site and a maximum rescue distance of the service site. In this case, the vehicle may obtain the location of the service site and the maximum rescue distance of the service site, and determine the rescue range of the service site based on the location of the service site and the maximum rescue distance of the service site.

In the foregoing implementation of the present disclosure, a manner in which the vehicle obtains the rescue range of the service site is described, and is operable.

With reference to the first aspect, or the first implementation to the eighth implementation of the first aspect of the embodiment of the present disclosure, in a ninth implementation of the first aspect of the embodiment of the present disclosure, a manner in which the vehicle performs version upgrade based on the to-be-upgraded installation package may be as follows: The vehicle first determines whether a vehicle status of the vehicle meets an upgrade condition, for example, whether the vehicle is in a P gear, whether the vehicle is in a static state (if the vehicle is in a driving state, the vehicle does not meet the upgrade condition), and whether remaining power reaches a preset threshold. If the vehicle determines that the vehicle meets the upgrade condition, the vehicle outputs to-be-upgraded installation reminder information. For example, the installation reminder information may be voice broadcast (e.g., "a software upgrade version has been downloaded, please install in time" is broadcast to a user by using an in-vehicle speaker), a vibration reminder, a ringing reminder, or the like. A specific form of the installation reminder information is not limited herein. The installation reminder information is used to indicate to enter an instruction to the vehicle. For example, when the user hears the broadcast installation reminder information, the user may enter a corresponding instruction to the vehicle. Finally, the vehicle may perform version upgrade on the to-be-upgraded installation package according to the entered instruction.

In the foregoing implementation of the present disclosure, a specific implementation in which the vehicle performs version upgrade based on the to-be-upgraded installation package is described, and can be implemented.

According to a second aspect, an embodiment of the present disclosure further provides a vehicle software upgrade method, and the method includes: First, a cloud server obtains a request message sent by a vehicle. The request message is used to indicate to the cloud server to send a rescue range of a service site to the vehicle, and the service site is one or more entity platforms for providing a rescue service for the vehicle or another vehicle whose software fails to be upgraded. Then, the cloud server sends the rescue range of the service site to the vehicle, so that the vehicle determines, based on a current location of the vehicle, whether the vehicle is located within the rescue range. The cloud server receives information that is about to-be-upgraded software of the vehicle and that is sent by the vehicle. The information about the to-be-upgraded software is sent by the vehicle when the current location of the vehicle is within the rescue range. The information about the to-be-upgraded software is used to indicate to the cloud server to search for a to-be-upgraded installation package of the to-be-upgraded software based on the information about the to-be-upgraded software. Finally, the cloud server finds the to-be-upgraded installation package, and sends the to-be-upgraded installation package to the vehicle, so that the vehicle performs upgrade based on the to-be-upgraded installation package.

In the foregoing implementation of the present disclosure, when a vehicle needs to perform version upgrade, the vehicle sends a request message to a cloud server, and the cloud server sends a rescue range of each service site to the vehicle accordingly. In addition, the vehicle determines a current location of the vehicle, and determines whether the vehicle is located within the rescue range of each service site. If the vehicle is located within the rescue range, the vehicle sends information about to-be-upgraded software of the vehicle to the cloud server. The cloud server determines to push to the vehicle, based on the information, an installation package type corresponding to a to-be-upgraded software version. Then, the vehicle determines, based on the obtained installation package type, how to perform upgrade. This method does not cause leakage of real-time location information of the vehicle compared with a conventional OTA software upgrade manner.

With reference to the second aspect of the embodiment of the present disclosure, in a first implementation of the second aspect of the embodiment of the present disclosure, that the cloud server receives information that is about to-be-upgraded software of the vehicle and that is sent by the vehicle may be specifically as follows: receiving the information about the to-be-upgraded software of the vehicle and first information indicating that the vehicle is located within the rescue range that are sent by the vehicle. The first information is used to indicate to the cloud server to select a to-be-upgraded installation package of a differential version type based on the first information.

In the foregoing implementation of the present disclosure, in addition to receiving the information about the to-be-upgraded software sent by the vehicle, the cloud server further receives the first information sent by the vehicle, so that the cloud server can send an installation package of a differential version type to the vehicle based on the first information. This is because the differential version has a small data amount, so that an amount of data sent by the cloud server to the vehicle is reduced. However, an upgrade failure rate of the differential version is higher than that of a full version. Since the vehicle is located within the rescue range at the time, the vehicle can be rescued in time even if the upgrade fails. In this case, downloads are greatly reduced, and user experience is improved.

With reference to the second aspect of the embodiment of the present disclosure, in a second implementation of the second aspect of the embodiment of the present disclosure, when the current location of the vehicle is outside the rescue range of the service site, the cloud server receives the information that is about the to-be-upgraded software of the vehicle and that is sent by the vehicle and second information indicating that the vehicle is outside the rescue range. The information about the to-be-upgraded software is sent by the vehicle when the vehicle is outside the rescue range. The information about the to-be-upgraded software is used to indicate to the cloud server to search for the to-be-upgraded installation package of the to-be-upgraded software based on the information about the to-be-upgraded software. The second information is used to indicate to the cloud server to select a to-be-upgraded installation package of a full version type based on the second information.

In the foregoing implementation of the present disclosure, when the vehicle is outside the rescue range of the service site, in addition to receiving the information that is about the to-be-upgraded software of the vehicle and that is sent by the vehicle, the cloud server further receives the second information sent by the vehicle, so that the cloud server may send the to-be-upgraded installation package of the full version type to the vehicle based on the second information. This is because an upgrade failure rate of the full version is relatively low, but a data amount is large, memory is occupied, and downloading is slow. Since the vehicle is outside the rescue range at the time, to reduce the upgrade failure rate, the cloud server is selected to send the to-be-upgraded installation package of the full version to the vehicle to reduce the upgrade failure rate.

With reference to the second aspect of the embodiment of the present disclosure, in a third implementation of the second aspect of the embodiment of the present disclosure, when the current location of the vehicle is outside the rescue range of the service site, the cloud server may not immediately send a to-be-upgraded installation package of a full version type of the to-be-upgraded software to the vehicle, the vehicle may first determine preset duration (which may be referred to as first preset duration). The vehicle periodically determines, within the preset duration, whether the vehicle enters the rescue range. If the vehicle re-enters the rescue range within the first preset duration, the cloud server still pushes the to-be-upgraded installation package of the full version type to the vehicle. If the vehicle has entered the rescue range within the preset duration, the cloud server receives the information that is about the to-be-upgraded software of the vehicle and that is sent by the vehicle and third information indicating that the vehicle has entered the rescue range within the preset duration. The information about the to-be-upgraded software is sent by the vehicle when the vehicle enters the rescue range within the preset duration. The information about the to-be-upgraded software is used to indicate to the cloud server to search for the to-be-upgraded installation package of the to-be-upgraded software based on the information about the to-be-upgraded software. The third information is used to indicate to the cloud server to select a to-be-upgraded installation package of a differential version type based on the third information.

In the foregoing implementation of the present disclosure, it is described in detail that buffer time (that is, the preset duration) may be provided for the vehicle when the vehicle is outside the rescue range. If the vehicle re-enters the rescue range within the preset duration, the cloud server receives the third information that is sent by the vehicle and that indicates that the vehicle has entered the rescue range within the preset duration, and then the cloud server sends the to-be-upgraded installation package of the differential version type to the vehicle based on the third information. In this manner, user experience is improved, and an actual application scenario is considered.

With reference to the third implementation of the second aspect of the embodiment of the present disclosure, in a fourth implementation of the second aspect of the embodiment of the present disclosure, before the cloud server receives the information that is about the to-be-upgraded software of the vehicle and that is sent by the vehicle and the third information indicating that the vehicle has entered the rescue range within the preset duration, the cloud server may further first send a notification message or a reminder message to the vehicle. The notification message is used to indicate to the vehicle to periodically determine, within the preset duration, whether the vehicle has entered the rescue range. The reminder message is used to indicate to the vehicle to enter the rescue range within the preset duration.

In the foregoing implementation of the present disclosure, it is described: when the vehicle is outside the rescue range, the cloud server sends the notification message or the reminder message to the vehicle, so that the vehicle enters the rescue range within the preset duration. This manner of sending the notification message or the reminder message improves a success rate for the vehicle to enter the rescue range within the preset duration.

With reference to the second aspect, or the first implementation to the fourth implementation of the second aspect of the embodiment of the present disclosure, in a fifth implementation of the second aspect of the embodiment of the present disclosure, that the cloud server sends the rescue range of the service site to the vehicle may be specifically as follows: sending a location of the service site and a maximum rescue distance of the service site to the vehicle, so that the vehicle determines the rescue range of the service site based on the received location of the service site and the received maximum rescue distance of the service site. Alternatively, the cloud server directly obtains a location of the service site and a maximum rescue distance of the service site, and after determining the rescue range of the service site based on the location of the service site and the maximum rescue distance of the service site, the cloud server sends the rescue range of each service site to the vehicle.

In the foregoing implementations of the present disclosure, several manners of determining the rescue range of the service site are described, and are flexible.

According to a third aspect, an embodiment of the present disclosure provides a control system. The control system is applied to a vehicle, and has a function of implementing the method in any one of the first aspect or the possible implementations of the first aspect. The function may be implemented by hardware, or may be implemented by hardware executing corresponding software. The hardware or the software includes one or more modules corresponding to the foregoing function.

According to a fourth aspect, an embodiment of the present disclosure provides a cloud server. The cloud server has a function of implementing the method in any one of the second aspect or the possible implementations of the second aspect. The function may be implemented by hardware, or may be implemented by hardware executing corresponding software. The hardware or the software includes one or more modules corresponding to the foregoing function.

According to a fifth aspect, an embodiment of the present disclosure further provides a control system. The control system is applied to a vehicle, and may include a memory and a processor. The memory is coupled to the processor. The memory is configured to store a program and instructions. The processor is configured to invoke the instructions stored in the memory to perform the method in any one of the first aspect or the possible implementations of the first aspect of the embodiment of the present disclosure.

According to a sixth aspect, an embodiment of the present disclosure further provides a cloud server. The cloud server may include a memory and a processor. The memory is coupled to the processor. The memory is configured to store a program and instructions. The processor is configured to invoke the instructions stored in the memory to perform the method in any one of the second aspect or the possible implementations of the second aspect of the embodiment of the present disclosure.

According to a seventh aspect, an embodiment of the present disclosure provides a computer-readable storage medium. The computer-readable storage medium stores instructions. When the instructions are run on a computer, the computer is enabled to perform the method in any one of the first aspect or the possible implementations of the first aspect, or the computer is enabled to perform the method in any one of the second aspect or the possible implementations of the second aspect.

According to an eighth aspect, an embodiment of the present disclosure provides a computer program product including instructions. When the computer program product runs on a computer, the computer is enabled to perform the method in any one of the first aspect or the possible implementations of the first aspect, or the computer is enabled to perform the method in any one of the second aspect or the possible implementations of the second aspect.

DESCRIPTION OF EMBODIMENTS

Embodiments of the present disclosure provide a vehicle software upgrade method and a related system, so that a vehicle determines, based on a location of the vehicle, whether the vehicle is located within a rescue range, and accordingly determines whether to upgrade a software version. This method does not cause leakage of real-time location information of the vehicle and protects user privacy compared with a conventional OTA upgrade manner. In addition, a cloud server returns an installation package type based on different determining results. The determining results include two cases: the vehicle is located within the rescue range and the vehicle is outside the rescue range. If the vehicle is outside the rescue range, a to-be-upgraded installation package of a full version type of to-be-upgraded software is delivered to the vehicle. If the vehicle is located within the rescue range, a to-be-upgraded installation package of a differential version type of to-be-upgraded software is delivered to the vehicle. This is flexible.

The following describes embodiments of the present disclosure with reference to accompanying drawings. A person of ordinary skill in the art may know that, with development of technologies and emergence of new scenarios, the technical solutions provided in embodiments of the present disclosure are also applicable to a similar technical problem.

In the specification, claims, and accompanying drawings of the present disclosure, the terms "first", "second", and the like are intended to distinguish between similar objects but do not indicate a specific order or sequence. It should be understood that the terms used in such a way are interchangeable in proper cases. This is merely a discrimination manner that is used when objects having a same attribute are described in embodiments of the present disclosure. In addition, the terms "include", "contain" and any other variants mean to cover the non-exclusive inclusion, so that a process, method, system, product, or device that includes a series of units is not limited to those units, but may include other units not expressly listed or inherent to such a process, method, product, or device.

Figure 1:
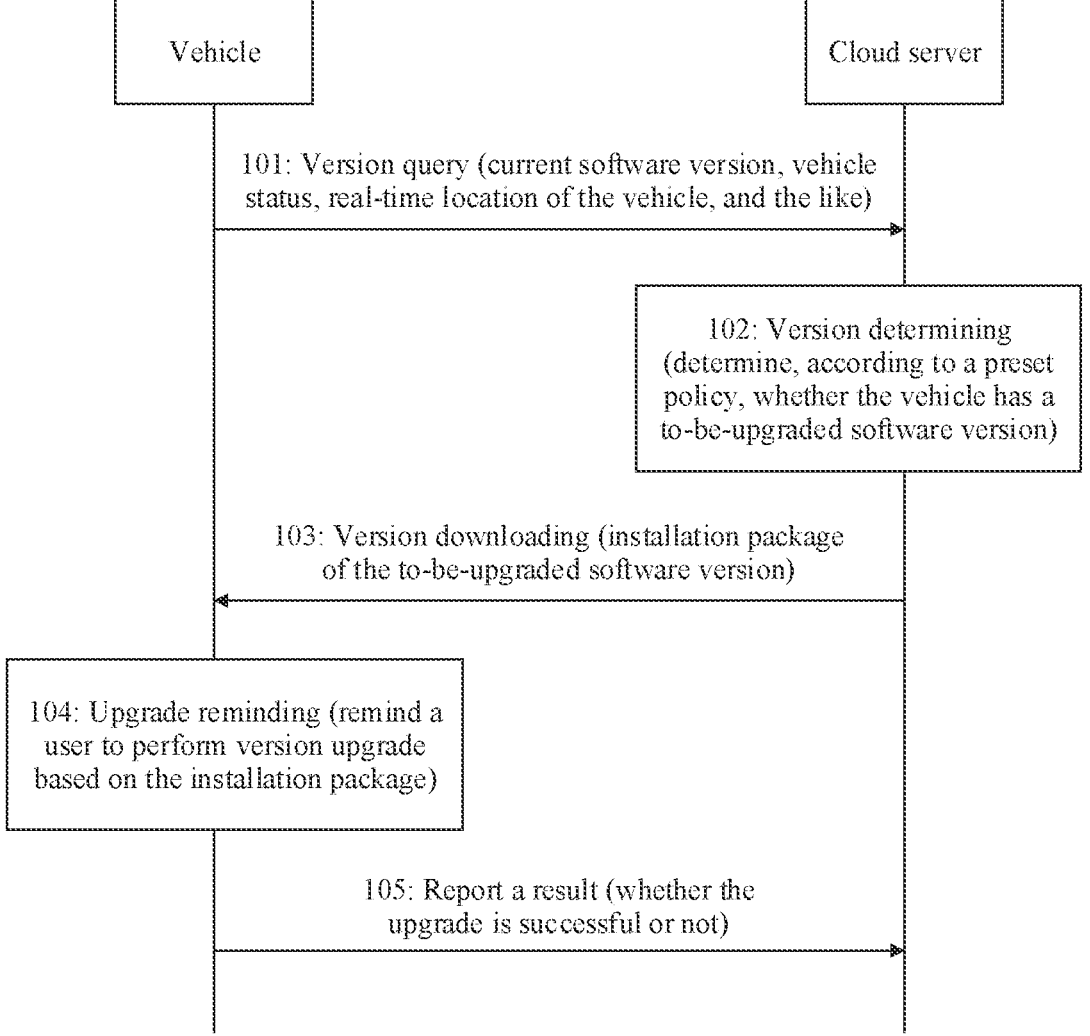
FIG. 1 is a schematic diagram of an existing OTA upgrade manner.

Before embodiments of the present disclosure are described, a currently existing OTA upgrade manner is first described. Refer to FIG. 1. The current OTA upgrade manner mainly includes the following steps: 101: Version query. To be specific, a vehicle sends information such as a current software version of the vehicle, a vehicle status, and a real-time location of the vehicle to a cloud server. 102: Version determining. To be specific, the cloud server determines, according to a preset policy, whether the vehicle has a to-be-upgraded software version. The determining mainly refers to information such as the current software version of the vehicle, a software version of the cloud server, the vehicle status, and the real-time location of the vehicle. 103: Version downloading. To be specific, if the cloud server determines that there is a software upgrade version corresponding to the vehicle, the cloud server delivers an installation package of the to-be-upgraded software version to the vehicle. Generally, no differentiated processing is performed in a version download phase, in other words, the cloud server directly queries, based on the current software version of the vehicle, whether there is a to-be-upgraded target version, and if there is a to-be-upgraded target version, the cloud server directly delivers an installation package corresponding to the target version to the vehicle. 104: Upgrade reminding: After downloading the installation package, the vehicle determines, based on the vehicle status, whether an upgrade condition is met (e.g., whether the vehicle is in a static state, whether a vehicle gear meets a requirement, whether a central console is turned on, and whether remaining power meets a requirement). If the upgrade condition is met, the vehicle outputs upgrade reminder information, to remind a user to perform version upgrade based on the installation package. A version upgrade process means that the vehicle completes an operation of replacing an old version with a new version. 105: Report a result. If the vehicle is successfully upgraded, the vehicle reports a result of successful upgrade to the cloud server; or if the vehicle fails to be upgraded, the vehicle reports a result of failed upgrade to the cloud server, so that the cloud server performs statistical processing based on different reporting results.

It can be learned from the foregoing description that, in a current existing OTA upgrade manner, a real-time location of a vehicle is obtained. This increases a risk of user privacy leakage. Based on this, an embodiment of the present disclosure first provides a vehicle software upgrade method, to provide a new OTA upgrade manner (e.g., including software version query, version downloading, and upgrade reminding) without obtaining a real-time location of a vehicle. For details, refer to FIG. 2.

201: The vehicle obtains a rescue range of a service site.

Figure 3:
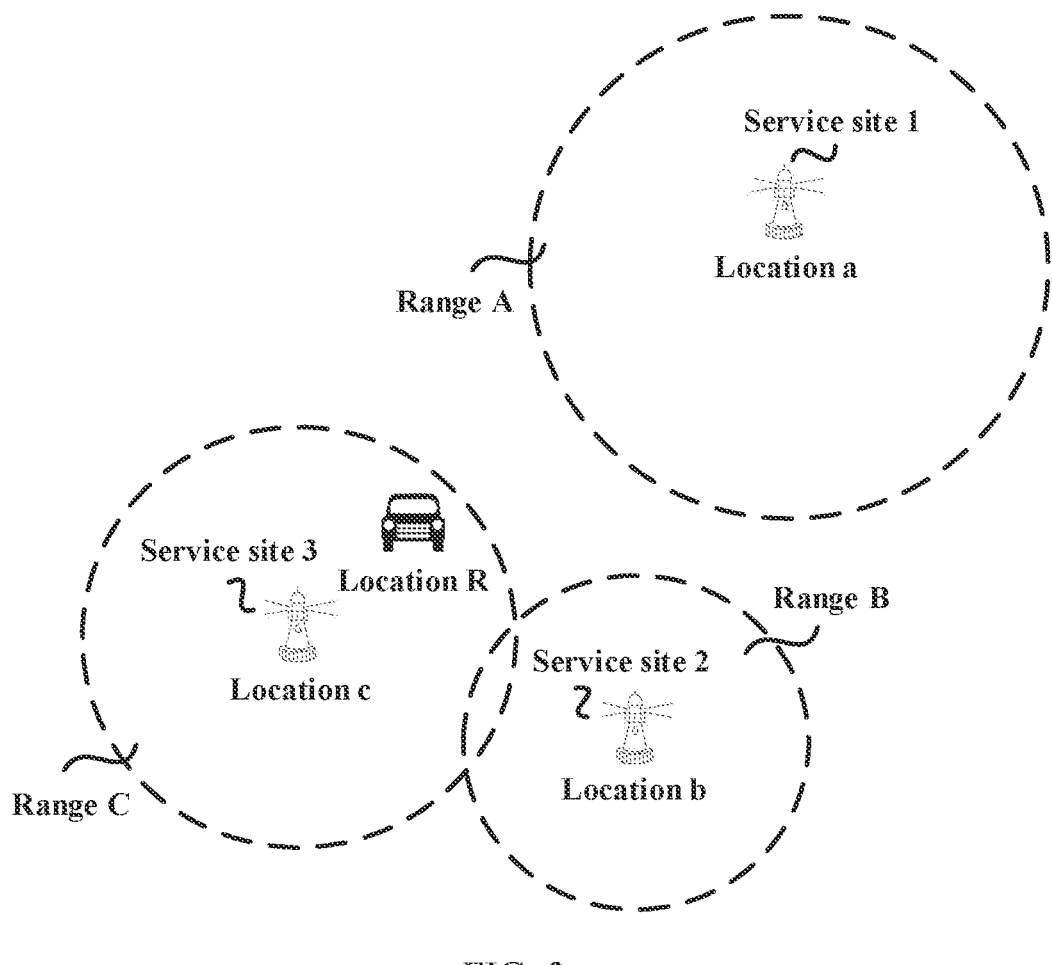
FIG. 3 is a schematic diagram of a location of a service site and a rescue range of the service site according to an embodiment of the present disclosure.

First, the vehicle obtains the rescue range of the service site. The service site may be specifically one or more entity platforms for providing a rescue service (which may also be referred to as having a rescue capability) for the vehicle or another vehicle whose software fails to be upgraded, for example, 4S shops and/or vehicle maintenance centers. For example, the service site is a 4S shop. A location of the service site described in the present disclosure is a set of locations of one or more 4S shops, and the rescue range of the service site is a set of areas that can be covered by rescue services provided by the 4S shops. FIG. 3 is used as an example for description. It is assumed that the vehicle is currently at a location R, and the vehicle separately obtains, in a preset manner, locations of a service site 1, a service site 2, and a service site 3 as a location a, a location b, and a location c, and obtains rescue ranges of the service site 1, the service site 2, and the service site 3 as a range A, a range B, and a range C. In this case, the location a, the location b, and the location c are all referred to as locations of the service site, and an area including the range A, the range B, and the range C is referred to as the rescue range in the present disclosure.

It should be noted that, in some implementations of the present disclosure, the rescue range of the service site may be represented in a plurality of forms, including but not limited to the following several cases: (1) The rescue range of the service site is determined based on a location of the service site and a maximum rescue distance of the service site. FIG. 3 is used as an example. If a maximum rescue distance of the service site 1 is 40 km, a circular area whose center is the location a of the service site 1 and whose radius is 40 km is the rescue range of the service site 1. (2) The rescue range of each service site is determined based on a geographical location. FIG. 3 is still used as an example. If the service site 1 is located in Bao'an District, Shenzhen, and the service site 2 is located in Luohu District, Shenzhen, it is determined that the rescue range of the service site 1 covers the entire region of the Bao'an District, and the rescue range of the service site 2 covers the entire region of Luohu District. Assuming that the rescue range of the service site is the first case, to obtain the rescue range of the service site, the vehicle needs to obtain the location of the service site and the maximum rescue distance of the service site.

It should be further noted that in some implementations of the present disclosure, the step of obtaining, by the vehicle, the rescue range of the service site may be triggered in a plurality of manners, including but not limited to the following several manners: (1) The vehicle sends a request message to a cloud server. The request message is used to indicate to the cloud server to send the rescue range of the service site to the vehicle. The request message may be triggered by the vehicle after the vehicle receives an instruction entered by a user. For example, if the user considers that the vehicle needs to perform software upgrade, the user enters a corresponding instruction to the vehicle. The instruction is used to trigger the vehicle to send the request message to the corresponding cloud server. (2) The user considers that the vehicle needs to perform software upgrade, and enters an instruction to the vehicle. The instruction is used to trigger the vehicle to obtain the rescue range of the service site from a storage device of the vehicle.

In this embodiment of the present disclosure, a manner (namely, the preset manner in FIG. 3) in which the vehicle obtains the location of the service site and the rescue range of the service site may include, but is not limited to, the following several manners:

a. The Cloud Server Sends the Rescue Range of the Service Site to the Vehicle.

In some implementations of the present disclosure, the cloud server stores rescue ranges of all service sites that are in a preset region (e.g., a China region or a US region) and that can provide a rescue service for the vehicle. For example, when the vehicle sends the request message to the cloud server, in response to the request message, the cloud server sends the rescue ranges of all the service sites in the preset region to the vehicle.

For example, assuming that there are 1000 4S shops/maintenance centers in the China region that can provide a rescue service, the cloud server stores detailed location information of the 1000 4S shops/maintenance centers and rescue ranges of the 1000 4S shops/maintenance centers. When the vehicle (provided that the vehicle is in the China region) sends the request message to the cloud server, the cloud server receives the request message, and sends the detailed location information of the 1000 4S shops/maintenance centers and the rescue ranges of the 1000 4S shops/maintenance centers to the vehicle. In some implementations, the rescue ranges of the 1000 4S shops/maintenance centers may also be directly sent to the vehicle without sending the detailed location information.

Considering that in an actual application scenario, a rescue range of each service site generally does not exceed an administrative region, in some implementations of the present disclosure, the vehicle may first determine a city (e.g., Shenzhen) in which the vehicle is located, and then the vehicle sends a notification to the cloud server. The notification is used to indicate to the cloud server to send, to the vehicle, a location of a service site that belongs to the Shenzhen region (that is, the service site that belongs to the Shenzhen region is determined from all the service sites that belong to the China region, and the determined location of each service site and a corresponding rescue range are sent to the vehicle). Alternatively, when sending the request message to the cloud server, the vehicle may carry, in the request message, information carried in the notification. This is not specifically limited herein.

The preceding example is still used. Assuming that there is a total of 1000 4S shops/maintenance centers in the China region that can provide a rescue service, the cloud server stores detailed location information of the 1000 4S shops/maintenance centers and rescue ranges of the 1000 4S shops/maintenance centers. When the vehicle sends the request message to the cloud server, the vehicle simultaneously determines, based on an application (such as Baidu Map, AutoNavi Map, or a global positioning system) installed on the vehicle, that the vehicle is located in Wuhan, carries information "the vehicle is located in Wuhan" in the request message, and sends the request message to the cloud server. The cloud server determines, based on the information, that 15 4S stores/maintenance centers in the 1000 4S stores/maintenance centers belong to Wuhan. In this case, the cloud server sends detailed location information of the 15 4S shops/maintenance centers belonging to Wuhan and rescue ranges of the 15 4S shops/maintenance centers to the vehicle.

b. The Vehicle Obtains the Rescue Range of the Service Site from the Vehicle.

Similar to the foregoing "a" manner, a difference lies in that in the "b" manner, rescue ranges of all service sites that are in the preset region and that can provide a rescue service for the vehicle are sent to the vehicle by the cloud server in advance. When a specific quantity of service sites in the preset region changes, the cloud server sends updated information to the vehicle. When the vehicle receives the instruction entered by the user to the vehicle, in response to the instruction, the vehicle directly obtains the rescue ranges of all the service sites in the preset region from the storage device of the vehicle. Similarly, in some implementations, the vehicle may store detailed location information of each service site, and the detailed location information may be provided by a third-party application (e.g., AutoNavi Map or Baidu Map) to the vehicle.

The preceding example is still used. Assuming that there is a total of 1000 4S shops/maintenance centers in the China region that can provide a rescue service, the cloud server stores detailed location information of the 1000 4S shops/maintenance centers and rescue ranges of the 1000 4S shops/maintenance centers, and sends the detailed location information of the 1000 4S shops/maintenance centers and the rescue ranges of the 1000 4S shops/maintenance centers to the vehicle before software upgrade. If locations of the 4S shops/maintenance centers change, or if a quantity of 4S shops/maintenance centers increases or decreases (e.g., 25 4S shops/maintenance centers are added or 10 4S shops/maintenance centers are reduced), the updated information is also sent to the vehicle in time, so that the vehicle maintains data accuracy. When the vehicle receives an instruction entered by the user to upgrade a to-be-upgraded version of currently-installed software, the vehicle does not need the cloud server to temporarily send the detailed location information of the 1000 4S shops/maintenance centers and the rescue ranges of the 1000 4S shops/maintenance centers, and the vehicle only needs to obtain the information from the storage device of the vehicle.

Similarly, considering that in an actual application scenario, because a rescue range of each service site generally does not exceed an administrative region, in some implementations of the present disclosure, the vehicle may first determine a city (e.g., Shenzhen) in which the vehicle is located, and then obtains, from the storage device of the vehicle, a rescue range of a service site belonging to the current city.

In some implementations of the present disclosure, alternatively, when the vehicle sends the request message to the cloud server, in response to the request message, the vehicle may obtain a current real-time location by using a positioning application (such as Baidu Map, AutoNavi Map, or a global positioning system) installed on the vehicle, and then obtains, from the storage device of the vehicle, location information of all service sites in an area whose center is the vehicle and whose radius is a specific distance (e.g., 100 km, where the distance cannot be less than a maximum distance at which a single service site can provide a rescue service) and rescue ranges of these service sites.

The preceding example is still used. Assuming that there is a total of 1000 4S shops/maintenance centers in the China region that can provide a rescue service, the cloud server stores detailed location information of the 1000 4S shops/maintenance centers and rescue ranges of the 1000 4S shops/maintenance centers, and sends the detailed location information of the 1000 4S shops/maintenance centers and the rescue ranges of the 1000 4S shops/maintenance centers to the vehicle before software upgrade. When the vehicle sends the request message to the cloud server, the vehicle also obtains a current real-time location "Wuhan Optics Valley Square" by using a Baidu map installed on the vehicle. Assuming that a maximum rescue range of the 1000 4S shops/maintenance centers is 60 km, the vehicle may determine, from the storage device of the vehicle, that there are three 4S shops/maintenance centers in an area whose center is "Wuhan Optics Valley Square" and whose radius is 70 km (a diameter may be preset, and is not less than 60 km). In this case, the vehicle determines detailed location information of the three 4S shops/maintenance centers as the location of the service site, and obtains rescue ranges of the three 4S shops/maintenance centers.

202: The vehicle obtains a current location of the vehicle.

The vehicle further obtains the current location of the vehicle. It should be noted that there is no sequence between step 201 and step 202. Step 201 may be performed first, or step 202 may be performed first, or step 201 and step 202 may be simultaneously performed. This is not limited herein.

203: The vehicle determines, based on the current location of the vehicle, whether the vehicle is located within the rescue range.

After the vehicle obtains the rescue range of each service site in the foregoing manner, the vehicle further determines, based on the location of the vehicle, whether the vehicle is located within the rescue range including the service sites. In implementations of the present disclosure, a manner in which the vehicle determines whether the vehicle is located within the rescue range including the service sites may include, but is not limited to, the following several manners. An example in which the rescue range is determined based on the location of the service site and the maximum rescue distance that can be provided by the service site is used below for description.

a. Rescue Capabilities of Service Sites are the Same.

In this case, the rescue range of each service site is the same, that is, the maximum rescue distance that can be provided by each service site is the same (e.g., the maximum rescue distance that can be provided by each service site is 50 km). In this case, it only needs to be determined whether a distance between the vehicle and each service site is less than 50 km. If the distance between the vehicle and each service site is less than 50 km, it is determined that the vehicle is located within the rescue range of the service site.

b. Rescue Capabilities of Service Sites are Different.

In this case, rescue ranges of the service sites are not completely the same. For example, a maximum rescue distance that can be provided by a service site is 70 km, and a maximum rescue distance that can be provided by another service site is 40 km. In this case, determining may be performed in the manner shown in FIG. 4. Step 1: The vehicle arranges, from near to far, distances between the vehicle and the service sites that are determined in the foregoing manner. Step 2: Determine, from a list, a service site (which may be referred to as a service site S) that is closest to the vehicle. Step 3: First determine whether a distance between the service site S and the vehicle exceeds a largest value of maximum rescue distances that can be provided by the service sites in the list. For example, it is assumed that there are five service sites in the list, and maximum rescue distances that can be provided by the five service sites are 80 km, 70 km, 60 km, 50 km, and 40 km respectively. Therefore, the largest value of the maximum rescue distances is 80 km. If it is determined that the distance between the service site S and the vehicle exceeds the largest value of the maximum rescue distances that can be provided by the service sites (e.g., the distance between the service site S and the vehicle is 90 km), it indicates that the service site S is outside the rescue range. If it is determined that the distance between the service site S and the vehicle does not exceed the largest value of the maximum rescue distances that can be provided by the service sites (e.g., the distance between the service site S and the vehicle is 65 km), step 4 is performed. Step 4: The vehicle further determines whether the distance between the vehicle and the service site S is within a maximum rescue distance that can be provided by the service site S. If the vehicle determines that the distance between the vehicle and the service site S is within the maximum rescue distance (which is assumed to be 70 km) that can be provided by the service site S, it is determined that the vehicle is located within the rescue range. If it is determined that the distance between the vehicle and the service site S is not within the maximum rescue distance (which is assumed to be 60 km) that can be provided by the service site S, step 5 is performed. Step 5: The vehicle deletes the service site S from the list, and then returns to step 2 to determine, from the list, a new service site S that is closest to the vehicle.

It should be noted that in some implementations of the present disclosure, step 2 to step 5 may be performed for only once to obtain a determining result (that is, the determining result is that the vehicle is located within the rescue range or is outside the rescue range). Alternatively, a maximum value (e.g., three times) of a quantity of executable times may be set. To be specific, when performing step 1 to step 5 for the first time, the vehicle determines that the vehicle is outside a rescue range of a current service site S1 (this is performed for the first time), and then selects a new service site S2 from the list again to perform step 2 to step 5 (this is performed for the second time). In this case, if it is determined that the vehicle is located within a rescue range of the current service site S2, a determining result is that the vehicle is located within the rescue range, and then step 2 to step 5 are not performed. Alternatively, if it is determined that the vehicle is still outside a rescue range of the current service site S2, a new service site S3 is selected from the list again to perform step 2 to step 5 (this is performed for the third time). In this case, if it is determined that the vehicle is outside a rescue range of the current service site S3, a determining result is that the vehicle is outside the rescue range. Alternatively, if it is determined that the vehicle is located within a rescue range of the current service site S3, a determining result is that the vehicle is located within the rescue range.

Figure 4:
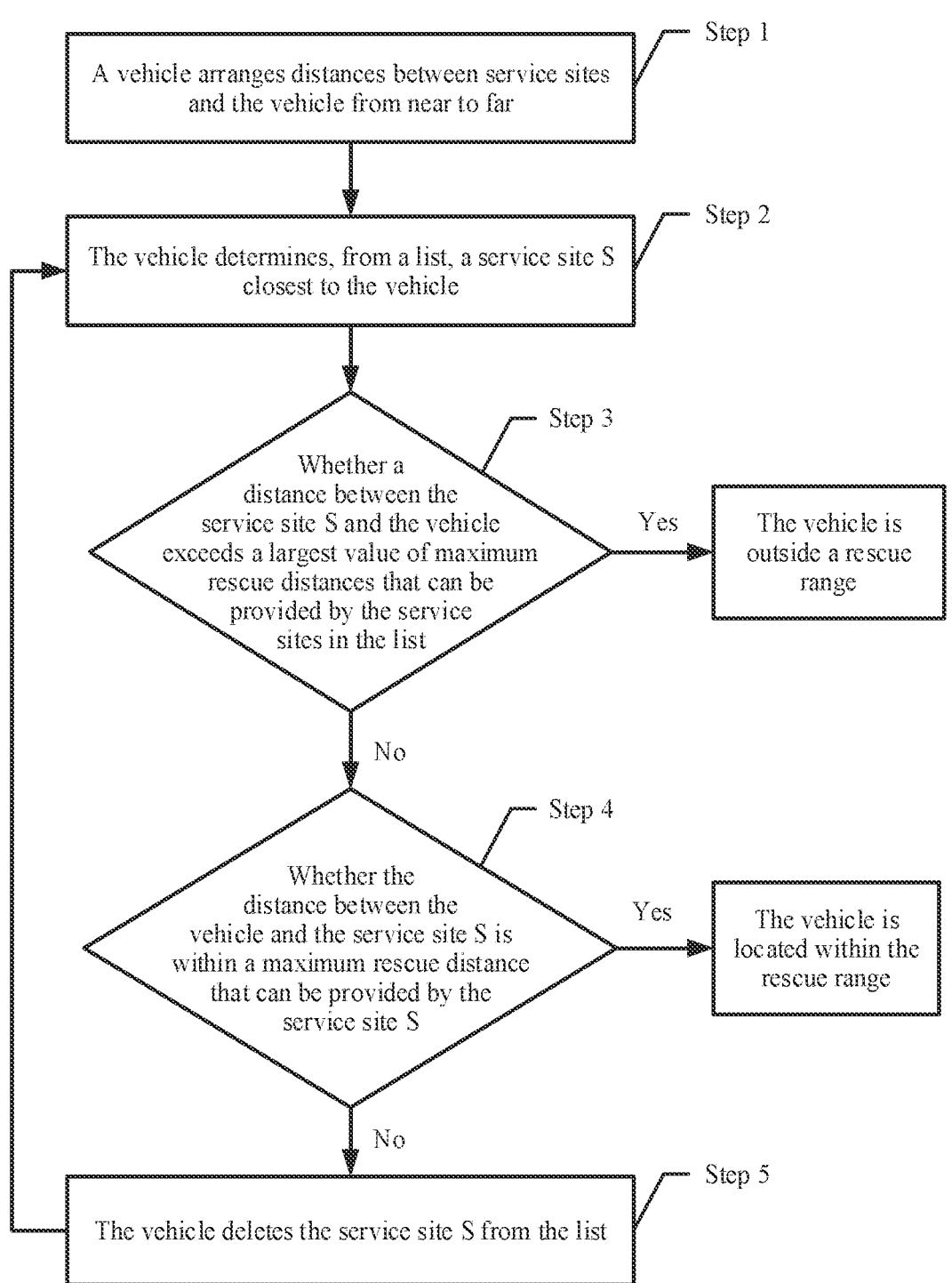
FIG. 4 is a schematic diagram in which a vehicle determines, based on a current location of the vehicle, whether the vehicle is located within a rescue range according to an embodiment of the present disclosure.

It should be further noted that the implementation corresponding to FIG. 4 is only one of manners of determining whether the vehicle is located within the rescue range including the service sites. In some implementations of the present disclosure, step 3 may be omitted, that is, it is directly determined whether a direct distance between the vehicle and a nearest service site is within a maximum rescue distance of the service site. A specific determining manner is not limited herein.

204: The vehicle sends information about to-be-upgraded software of the vehicle to the cloud server.

If the vehicle determines, based on the current location of the vehicle, that the vehicle is located within the rescue range, the vehicle sends the information about the to-be-upgraded software of the vehicle to the cloud server. The information about the to-be-upgraded software is used to indicate to the cloud server to search for a to-be-upgraded installation package of the to-be-upgraded software based on the information about the to-be-upgraded software.

It should be noted that, in some implementations of the present disclosure, the information about the to-be-upgraded software may include information about a currently-installed software version of the vehicle, for example, a type, a version number, and last update time of the currently-installed version of the vehicle. The information about the to-be-upgraded software may also include information about a to-be-upgraded software version, for example, information such as a version number of the to-be-upgraded software of the vehicle and a version number of currently-installed software, provided that the cloud server can determine the information about the to-be-upgraded installation package of the to-be-upgraded software of the vehicle based on the related information sent by the vehicle. The information about the to-be-upgraded software is not specifically limited herein.

It should be noted that, in some implementations of the present disclosure, if the vehicle is located within the rescue range of the service site, in addition to sending the information about the to-be-upgraded software of the vehicle to the cloud server, the vehicle may further send, to the cloud server, first information indicating that the vehicle is located within the rescue range. The first information is used to indicate to the cloud server to select a to-be-upgraded installation package of a differential version type based on the first information.

205: The cloud server sends the found to-be-upgraded installation package of the to-be-upgraded software to the vehicle.

After the cloud server receives the information that is about the to-be-upgraded software and that is sent by the vehicle, the cloud server searches, based on the information, whether there is a to-be-upgraded installation package (which may be referred to as an installation package for short) of the to-be-upgraded software version. If there is the installation package, the cloud server sends the installation package to the vehicle. If there is no installation package, the cloud server may send notification information to the vehicle. The notification information may be used to notify the vehicle that the to-be-upgraded software has no upgrade version to update currently, or may be used to notify the vehicle of time at which an upgrade version corresponding to the vehicle is to be released. Specific content included in the notification information is not limited herein.

It should be noted that, in some implementations of the present disclosure, if the vehicle is located within the rescue range, the cloud server may preferentially send the to-be-upgraded installation package corresponding to the differential version to the vehicle. If there is no differential version of a corresponding software upgrade version on the cloud server, the cloud server sends a to-be-upgraded installation package corresponding to a full version to the vehicle.

206: The vehicle performs upgrade based on the to-be-upgraded installation package.

After obtaining the to-be-upgraded installation package of the to-be-upgraded software, the vehicle may perform version upgrade based on the to-be-upgraded installation package. A manner in which the vehicle performs upgrade based on the to-be-upgraded installation package may be as follows: The vehicle first determines whether a vehicle status of the vehicle meets an upgrade condition, for example, whether the vehicle is in a P gear, whether the vehicle is in a static state (if the vehicle is in a driving state, the vehicle does not meet the upgrade condition), and whether remaining power reaches a preset threshold. If the vehicle determines that the vehicle meets the upgrade condition, the vehicle outputs to-be-upgraded installation reminder information. For example, the installation reminder information may be voice broadcast (e.g., "a software upgrade version has been downloaded, please install in time" is broadcast to the user by using an in-vehicle speaker), a vibration reminder, a ringing reminder, or the like. A specific form of the installation reminder information is not limited herein. The installation reminder information is used to indicate to enter an instruction to the vehicle. For example, when the user hears the broadcast installation reminder information, the user may enter a corresponding instruction to the vehicle. Finally, the vehicle may upgrade the to-be-upgraded installation package according to the entered instruction.

It should be noted that, in some implementations of the present disclosure, if the determining result is that the vehicle is outside the rescue range, in addition to sending the information about the to-be-upgraded software of the vehicle to the cloud server, the vehicle may further send, to the cloud server, second information indicating that the vehicle is outside the rescue range. The information about the to-be-upgraded software is used to indicate to the cloud server to search for a to-be-upgraded installation package of the to-be-upgraded software based on the information about the to-be-upgraded software. The second information is used to indicate to the cloud server to select a to-be-upgraded installation package of a full version type based on the second information. After the cloud server finds the full version of the to-be-upgraded software, the cloud server sends the to-be-upgraded installation package corresponding to the full version to the vehicle. Then, the vehicle performs upgrade based on the to-be-upgraded installation package corresponding to the full version. Similarly, a manner in which the vehicle performs upgrade based on the to-be-upgraded installation package corresponding to the full version is similar to that in step 205. Details are not described herein again. In the foregoing implementations of the present disclosure, the cloud server flexibly selects, based on the determining result, a type of the installation package that is of the to-be-upgraded software and that is sent to the vehicle. If the vehicle is located within the rescue range, the cloud server delivers the to-be-upgraded installation package corresponding to the differential version. The differential version has a small data amount, so that an amount of data sent by the cloud server to the vehicle is reduced. However, an upgrade failure rate of the differential version is higher than that of the full version. Since the vehicle is located within the rescue range at the time, the vehicle can be rescued in time even if the upgrade fails. In this case, downloads can be greatly reduced. If the vehicle is outside the rescue range, the cloud server delivers the to-be-upgraded installation package corresponding to the full version. The upgrade failure rate of the full version is relatively low, but a data amount is large, memory is occupied, and downloading is slow. Because the vehicle is outside the rescue range at the time, to reduce an upgrade failure rate, the cloud server is selected to send the to-be-upgraded installation package corresponding to the full version to the vehicle. However, a current manner of delivering the to-be-upgraded installation package of the to-be-upgraded software is sending only the full version to the vehicle or sending only the differential version to the vehicle. Therefore, the foregoing embodiment of the present disclosure has flexibility.

It should be further noted that, in some implementations of the present disclosure, if the determining result is that the vehicle is outside the rescue range, the cloud server may not immediately send the to-be-upgraded installation package corresponding to the full version to the vehicle, and the vehicle may further determine preset duration (which may be referred to as first preset duration). If the vehicle re-enters the rescue range within the first preset duration, the cloud server still pushes the to-be-upgraded installation package corresponding to the differential version to the vehicle. A manner of determining whether the vehicle re-enters the rescue range within the first preset duration may be but is not limited to the following manners:

a. The vehicle obtains a notification message. The notification message is used to indicate to the vehicle to periodically (e.g., a preset periodicity T1, where T1 is less than the first preset duration) determine, within the first preset duration, whether the vehicle has entered the rescue range of the service site. The notification message may be generated by the vehicle, or may be sent by the cloud server. This is not specifically limited herein. If the vehicle determines, based on the notification message, that the vehicle has entered the rescue range within the first preset duration, the vehicle sends, to the cloud server, the information about the to-be-upgraded software of the vehicle and third information indicating that the vehicle has entered the rescue range within the first preset duration. The information about the to-be-upgraded software is used to indicate to the cloud server to search for a to-be-upgraded installation package of the to-be-upgraded software based on the information about the to-be-upgraded software. The third information is used to indicate to the cloud server to select a to-be-upgraded installation package of a differential version type based on the third information. Then, the cloud server sends the to-be-upgraded installation package of the differential version type to the vehicle. Finally, the vehicle performs upgrade based on the to-be-upgraded installation package.

b. The vehicle obtains a reminder message. The reminder message is used to remind the vehicle to enter the rescue range of the service site within the first preset duration. Similar to the foregoing notification message, the reminder message may be generated by the vehicle, or may be sent by the cloud server. This is not specifically limited herein. If the vehicle determines, based on the reminder message, that the vehicle has entered the rescue range within the first preset duration, the vehicle sends, to the cloud server, the information about the to-be-upgraded software of the vehicle and third information indicating that the vehicle has entered the rescue range within the first preset duration. The information about the to-be-upgraded software is used to indicate to the cloud server to search for a to-be-upgraded installation package of the to-be-upgraded software based on the information about the to-be-upgraded software. The third information is used to indicate to the cloud server to select a to-be-upgraded installation package of a differential version type based on the third information. Then, the cloud server sends the to-be-upgraded installation package of the differential version type to the vehicle. Finally, the vehicle performs upgrade based on the to-be-upgraded installation package.

It should be noted that, if the vehicle still does not enter the rescue range within the first preset duration, it indicates that there is a high probability that the vehicle is located in a remote area. In this case, the vehicle sends, to the cloud server, the information about the to-be-upgraded software of the vehicle and fourth information indicating that the vehicle does not enter the rescue range within the first preset duration. The information about the to-be-upgraded software is used to indicate to the cloud server to search for a to-be-upgraded installation package of the to-be-upgraded software based on the information about the to-be-upgraded software. The fourth information is used to indicate to the cloud server to select a to-be-upgraded installation package of a full version type based on the fourth information. Then, the cloud server sends the to-be-upgraded installation package of the full version type to the vehicle. Finally, the vehicle performs upgrade based on the to-be-upgraded installation package. It should be noted that, in the foregoing implementations of the present disclosure, the first preset duration and the preset periodicity T1 may be preset when the vehicle is delivered from a factory, or may be updated when a software version is installed last time, or may be separately pushed by the cloud server to the vehicle. This is not specifically limited herein.

In the implementations of the present disclosure, when a vehicle needs to perform version upgrade, the vehicle first obtains a rescue range of each service site, determines a current location of the vehicle, and determines whether the vehicle is located within the rescue range of each service site (the rescue range of each service site may be delivered by a cloud server or stored by the vehicle). If the vehicle is located within the rescue range, the vehicle sends information about to-be-upgraded software of the vehicle to the cloud server. The cloud server determines to push to the vehicle, based on the information, an installation package type corresponding to a to-be-upgraded software version. Then, the vehicle determines, based on the obtained installation package type, how to perform upgrade. This method does not cause leakage of real-time location information of the vehicle compared with a conventional OTA software upgrade manner.

It should be noted that, in the foregoing implementations of the present disclosure, an operation of performing upgrade by the vehicle based on the to-be-upgraded installation package is usually performed in time after the vehicle obtains a corresponding installation package type. In an embodiment, the vehicle may determine upgrade duration (the upgrade duration may be preset when the vehicle is delivered from a factory, or may be updated when a software version is installed last time, or may be separately pushed by the cloud server to the vehicle, which is not specifically limited herein). A first event that triggers the upgrade duration to start timing may be "the vehicle determines that the determining result is that the vehicle is located within the rescue range", or may be "the vehicle determines that the vehicle re-enters the rescue range within the first preset duration". This is not specifically limited herein. This is to prevent the vehicle from driving out of the rescue range of the service site. If the vehicle performs software upgrade out of the rescue range and the upgrade fails, rescue costs are increased. For example, when the vehicle determines, based on the foregoing step 203, that the determining result is that the vehicle is located within the rescue range, the vehicle (e.g., a timing module of the vehicle) is triggered to start timing. If upgrade duration that is set at the beginning is one hour, when the vehicle meets the upgrade condition, the installation reminder information output by the vehicle may be further used to indicate to enter an instruction within one hour (e.g., a voice reminder "a software upgrade version has been downloaded, please install the software within one hour" is sent to the user). In this way, a probability that the user enters an instruction to the vehicle can be increased, so that a probability that the vehicle is upgraded within the upgrade duration is greatly increased.

It should be further noted that, in some implementations of the present disclosure, if the vehicle does not perform upgrade within given upgrade duration after obtaining the to-be-upgraded installation package sent by the cloud server, the vehicle is likely to have driven out of the rescue range. In this case, before the vehicle performs the step of performing upgrade based on the to-be-upgraded installation package, the vehicle further needs to determine again, based on the location of each service site and the current location of the vehicle, whether the vehicle is located within the rescue range. If the determining result is that the vehicle is located within the rescue range, the vehicle may perform an upgrade operation in the foregoing manner. If the determining result is that the vehicle is outside the rescue range, the vehicle may determine preset duration (which may be referred to as second preset duration), and an event that triggers timing of the second preset duration may be "the upgrade duration is reached, but the vehicle has not performed software upgrade". Within the second preset duration, the vehicle periodically (e.g., a preset periodicity T2, where T2 is less than the second preset duration) determines whether the vehicle has entered the rescue range. Alternatively, the vehicle receives the reminder notification sent by the cloud server. The reminder notification is used to indicate to the vehicle to enter the rescue range as soon as possible within the second preset duration. This is not specifically limited herein. If it is determined, within the second preset duration, that the vehicle re-enters the rescue range, the vehicle may perform the upgrade operation in the foregoing manner. If the vehicle still does not enter the rescue range within the second preset duration, it indicates that there is a high probability that the vehicle is located in a remote area. In this case, if the version upgrade fails, rescue costs are increased. In this case, the vehicle may output the installation reminding information. The installation reminder information is used to indicate to the user to perform upgrade with caution (e.g., broadcast "the vehicle is outside the rescue range, perform upgrade with caution" to the user by using an in-vehicle speaker).

It should be noted that, similar to the upgrade duration, the second preset duration, the preset periodicity T2, and the reminder notification may all be preset when the vehicle is delivered from a factory, or may be updated when a software version is installed last time, or may be separately pushed by the cloud server to the vehicle. This is not specifically limited herein.

It should be noted that, in some implementations of the present disclosure, the vehicle may alternatively report related information (e.g., information such as a version that is currently upgraded, whether the upgrade succeeds, and upgrade time) of an installation result to the cloud server.

It should be noted that, in the foregoing implementations, information about a currently-installed software version of the vehicle and the determining result (that is, the vehicle is located within the rescue range, or the vehicle is outside the rescue range) that is obtained by the vehicle are sent to the cloud server together. In some implementations of the present disclosure, alternatively, the vehicle may separately send a software upgrade request to the cloud server. The software upgrade request includes the information about the currently-installed software version of the vehicle, and the software upgrade request may replace the foregoing request message, used to trigger the cloud server to send the rescue range of the service site to the vehicle. For details, refer to FIG. 5.

501: A vehicle sends a software upgrade request to a cloud server.

First, the vehicle sends the software upgrade request to the cloud server. The software upgrade request includes information about a currently-installed software version of the vehicle. The software upgrade request may be triggered by the vehicle after the vehicle receives an instruction entered by a user. For example, if the user considers that the vehicle needs to perform software upgrade, the user enters a corresponding instruction to the vehicle, and the instruction is used to trigger the vehicle to send a software upgrade request to a corresponding cloud server. Alternatively, the software upgrade request may be automatically sent to the cloud server when a software version currently used by the vehicle reaches a preset periodicity. For example, it is assumed that the software version currently used by the vehicle is installed on Jun. 15, 2019. If the preset periodicity is set to six months, the vehicle automatically sends the software upgrade request to the cloud server on Dec. 16, 2019. How to trigger the vehicle to send the software upgrade request to the cloud server is not specifically limited in the present disclosure.

502: The cloud server determines a software upgrade version based on the software upgrade request.

After the cloud server obtains the software upgrade request sent by the vehicle, because the software upgrade request includes the information about the currently-installed software version of the vehicle, the cloud server searches, based on the software upgrade request, for an upgrade version corresponding to the software version. If the upgrade version corresponding to the software version exists, it may be determined that the corresponding software upgrade version is a target version to be sent to the vehicle. If the upgrade version corresponding to the software version does not exist, the cloud server may send notification information to the vehicle. The notification information may be used to notify the vehicle that there is no updated upgrade version for the software version currently, or may be used to notify the vehicle of time at which an upgrade version corresponding to the current software version is to be released. Specific content included in the notification information is not limited herein.

503: The vehicle obtains a rescue range of a service site.

If the cloud server determines that there is a corresponding upgrade version, the cloud server may send an acknowledgment message to the vehicle. The acknowledgment message is used to indicate that the cloud server has an upgrade version for the vehicle, and then the vehicle obtains the rescue range of the service site.

Similarly, in some implementations of the present disclosure, a manner in which the vehicle obtains the rescue range of the service site (that is, the preset manner described in FIG. 3) may include, but is not limited to, the following several manners: a. The cloud server sends the rescue range of the service site to the vehicle. b. The vehicle obtains the rescue range of the service site from the vehicle. A specific obtaining manner is described in the embodiment corresponding to FIG. 2. Details are not described herein again.

504: The vehicle determines, based on a current location of the vehicle, whether the vehicle is located within the rescue range.

Figure 2:
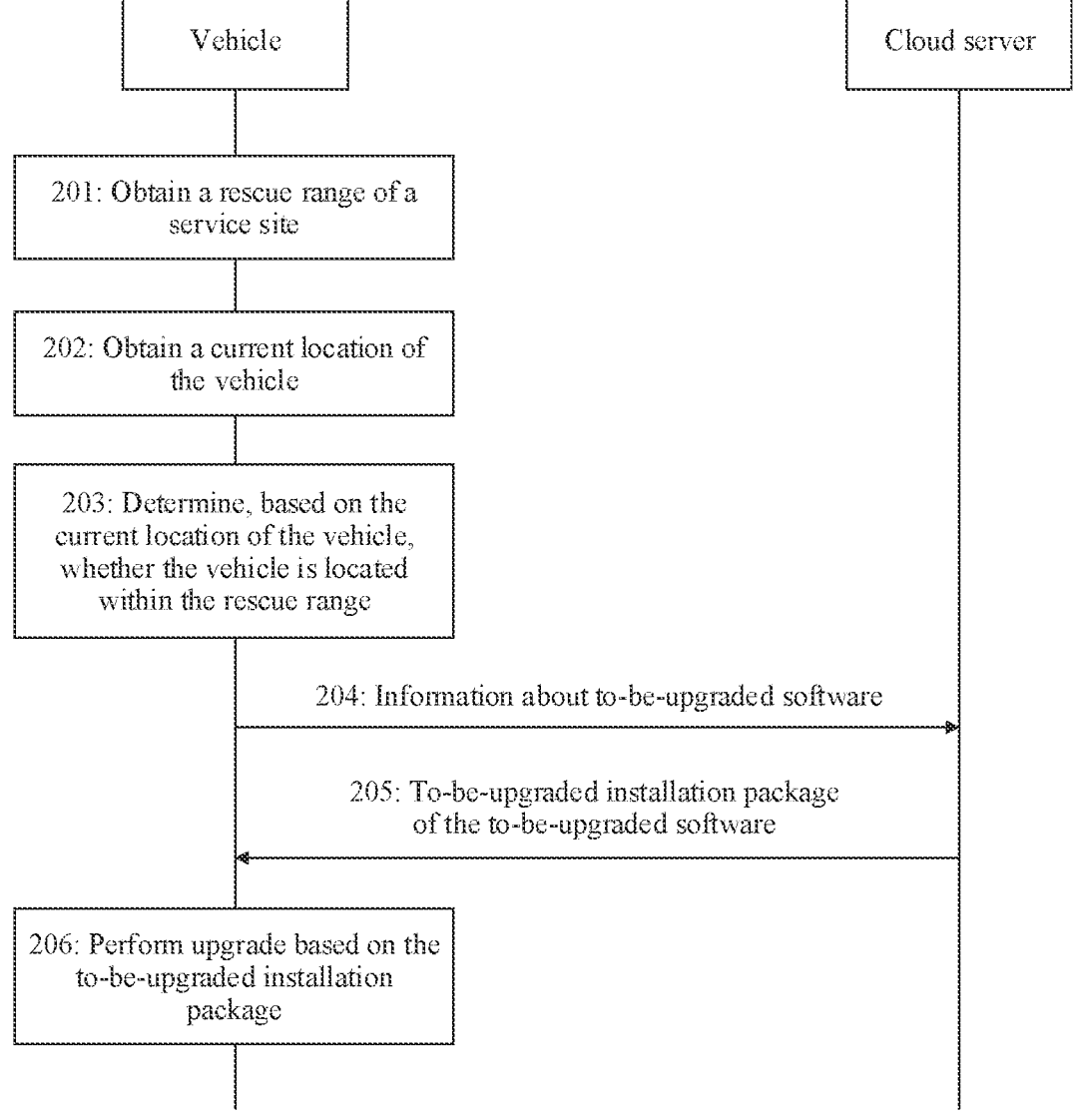
FIG. 2 is a schematic diagram of a control method for vehicle software upgrade according to an embodiment of the present disclosure.

Step 504 is similar to step 203 in the embodiment corresponding to FIG. 2. Details are not described herein again.

505: The vehicle sends a determining result to the cloud server.

Then, the vehicle sends the determining result to the server.

506: The cloud server determines a to-be-upgraded installation package of to-be-upgraded software based on the determining result.

After obtaining the determining result sent by the vehicle, the cloud server determines the to-be-upgraded installation package of the to-be-upgraded software based on the determining result. The to-be-upgraded installation package includes a to-be-upgraded installation package corresponding to a differential version and a to-be-upgraded installation package corresponding to a full version.

507: If the determining result is that the vehicle is located within the rescue range, the cloud server sends the to-be-upgraded installation package corresponding to the differential version to the vehicle.

If the determining result is that the vehicle is located within the rescue range, the cloud server sends the to-be-upgraded installation package corresponding to the differential version to the vehicle.

508: The vehicle performs upgrade based on the to-be-upgraded installation package corresponding to the differential version.

After obtaining the to-be-upgraded installation package corresponding to the differential version, the vehicle may perform upgrade based on the to-be-upgraded installation package corresponding to the differential version. A manner in which the vehicle performs upgrade based on the to-be-upgraded installation package corresponding to the differential version may be as follows: The vehicle first determines whether a vehicle status of the vehicle meets an upgrade condition, for example, whether the vehicle is in a P gear, whether the vehicle is in a static state (if the vehicle is in a driving state, the vehicle does not meet the upgrade condition), and whether remaining power reaches a preset threshold. If the vehicle determines that the vehicle meets the upgrade condition, the vehicle outputs to-be-upgraded installation reminder information. For example, the installation reminder information may be voice broadcast (e.g., "a software upgrade version has been downloaded, please install in time" is broadcast to the user by using an in-vehicle speaker), a vibration reminder, a ringing reminder, or the like. A specific form of the installation reminder information is not limited herein. The installation reminder information is used to indicate to enter an instruction to the vehicle. For example, when the user hears the broadcast installation reminder information, the user may enter a corresponding instruction to the vehicle. Finally, the vehicle may upgrade, according to the entered instruction, the to-be-upgraded installation package corresponding to the differential version.

It should be noted that in some implementations of the present disclosure, if the determining result is that the vehicle is outside the rescue range, a processing manner between the vehicle and the server is similar to the processing manner in the embodiment corresponding to FIG. 2. Details are not described herein again.

Figure 5:
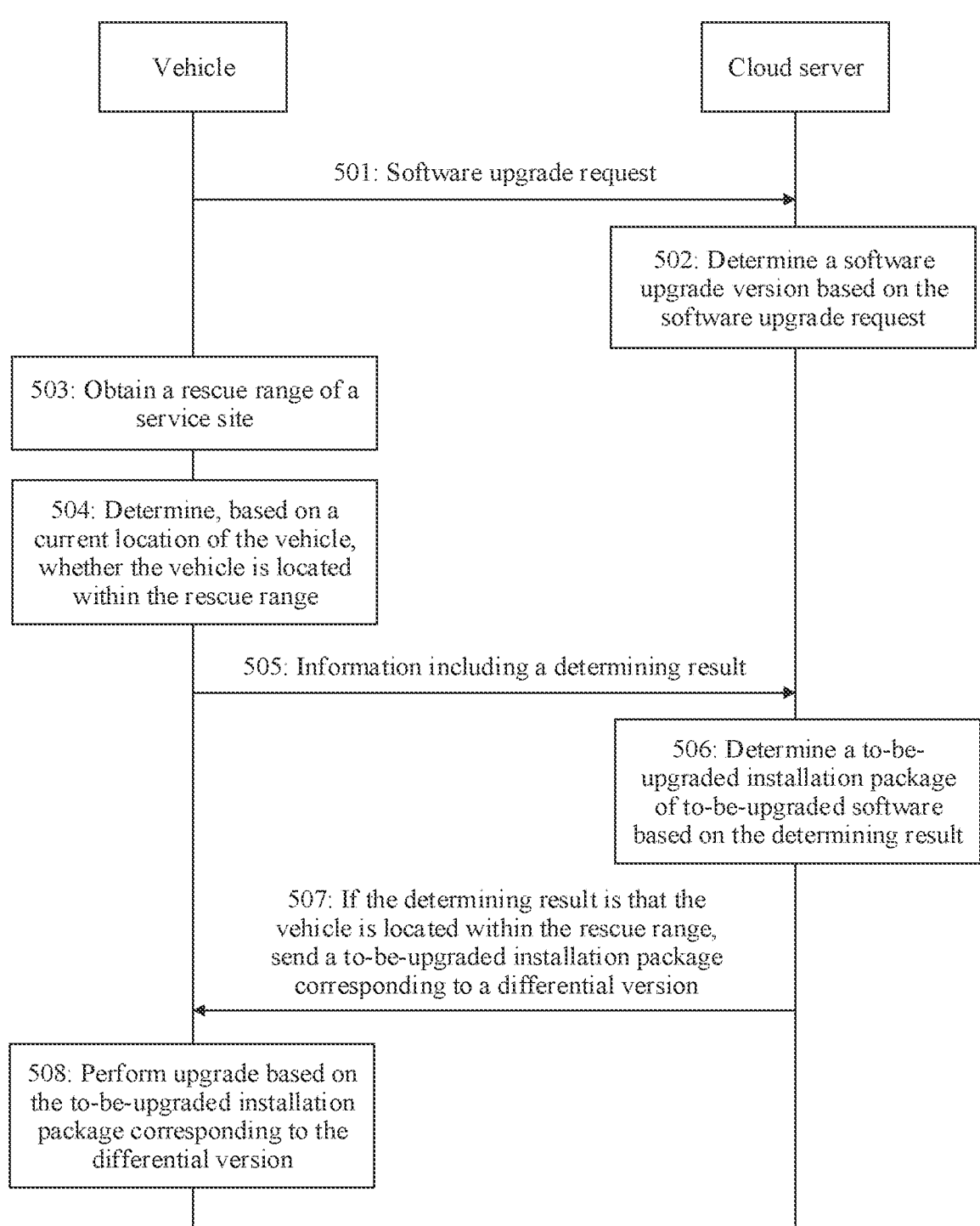
FIG. 5 is a schematic diagram of another vehicle software upgrade method according to an embodiment of the present disclosure.
Figure 6A:
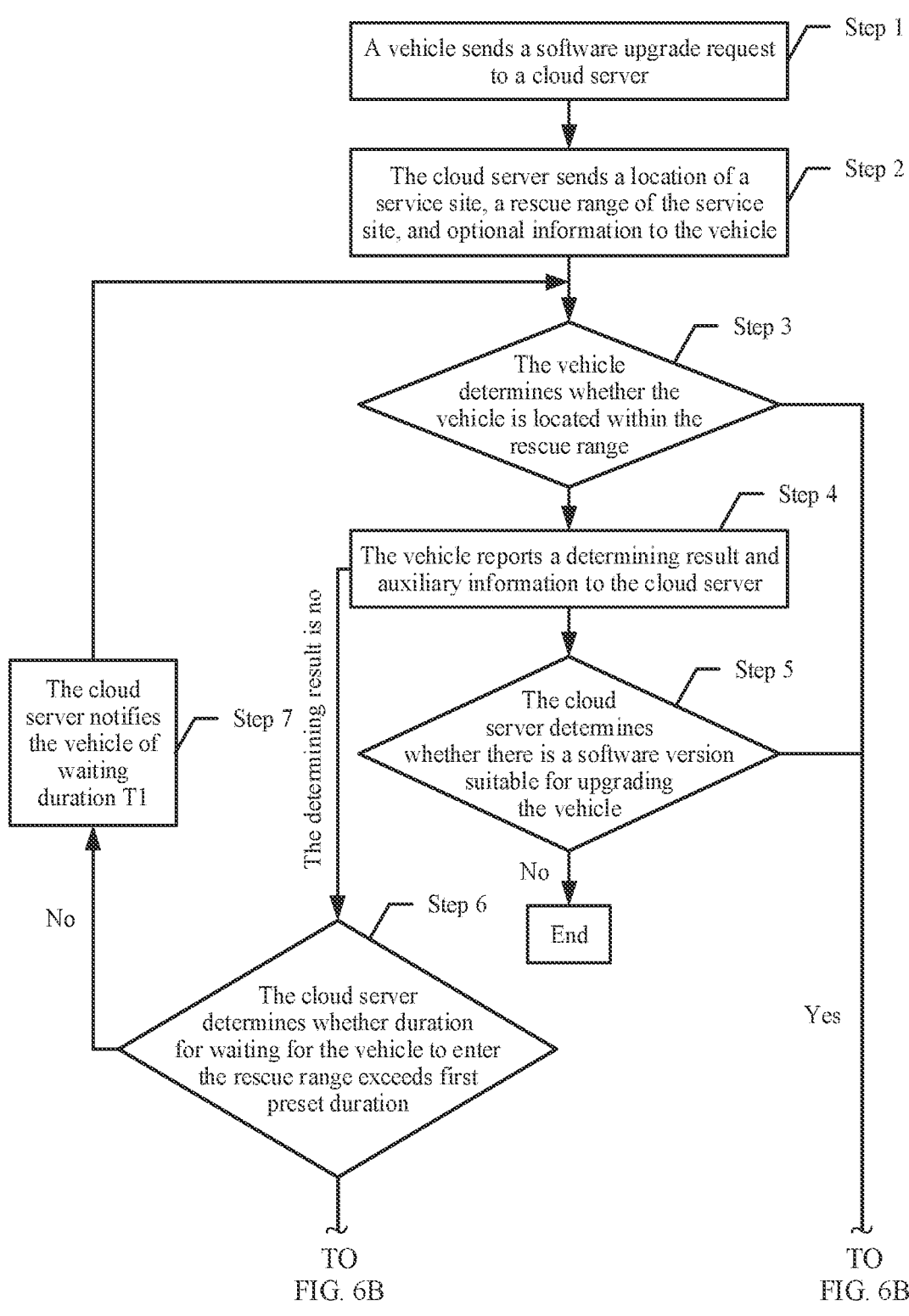
FIG. 6A and FIG. 6B are schematic diagrams of still another vehicle software upgrade method according to an embodiment of the present disclosure.
Figure 6B:
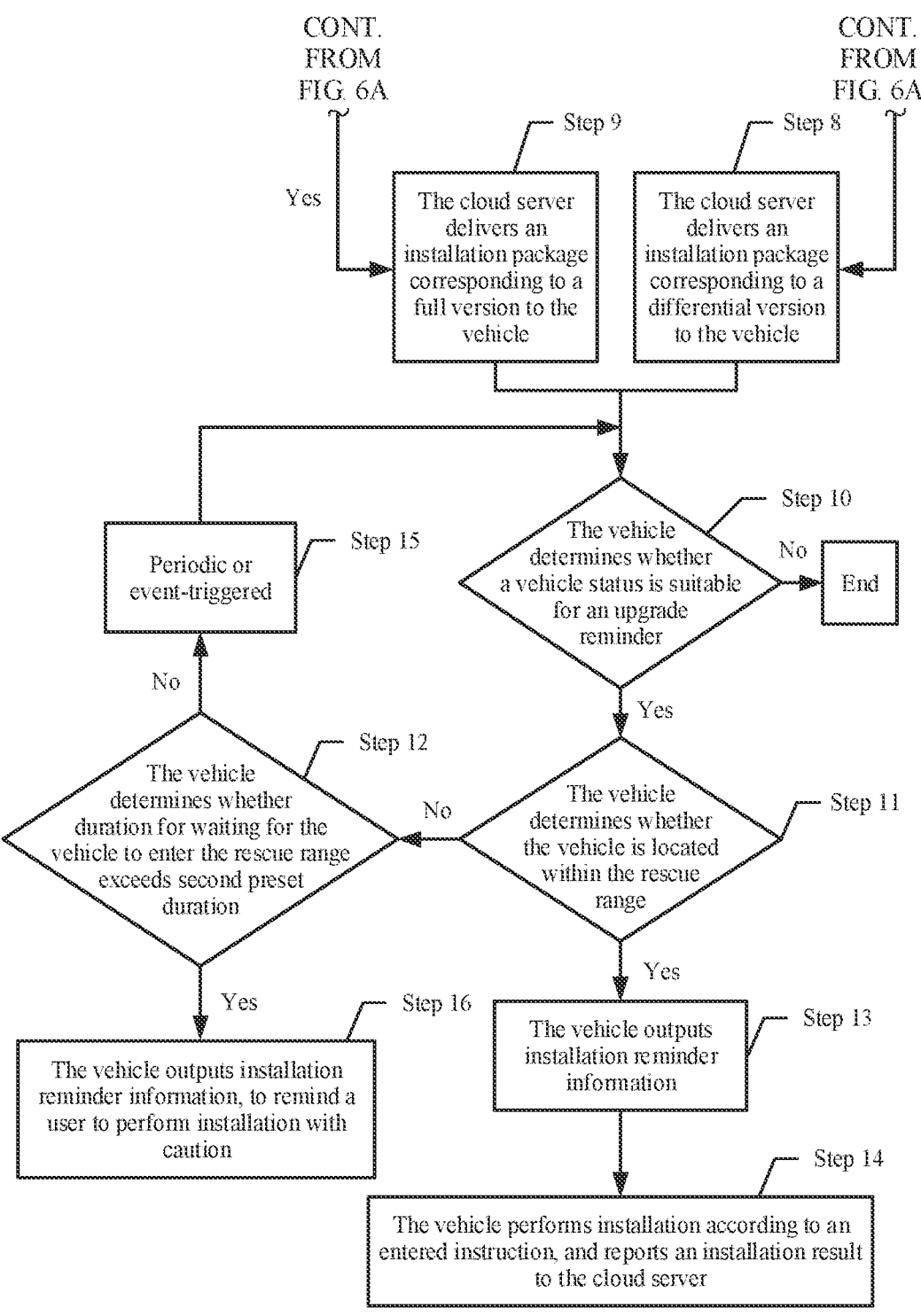

Based on the implementations in FIG. 2 and FIG. 5, for example, a vehicle software upgrade method according to an embodiment of the present disclosure is described in more detail. Refer to FIG. 6A and FIG. 6B. It should be noted that the vehicle software upgrade method in FIG. 6A and FIG. 6B is merely an example of the foregoing implementations. In some implementations of the present disclosure, more or fewer steps may be included, and a sequence of steps may also be adjusted based on an actual situation. This is not specifically limited herein.

Step 1: A vehicle sends a software upgrade request to a cloud server, so as to trigger the corresponding cloud server to perform step 2.

Step 2: The cloud server delivers, to the vehicle, a location of a service site (e.g., a 4S shop/maintenance center corresponding to the vehicle) that can provide a rescue service for the vehicle and a rescue range in which each service site can provide a rescue service. The cloud server may further send some optional information to the vehicle, for example, a maximum rescue distance in each service site, longest waiting time (that is, the first preset duration in the foregoing embodiment) when the vehicle is outside the rescue range, a preset periodicity T1 for query within the longest waiting time, longest waiting time (that is, the second preset duration in the foregoing embodiment) when the vehicle is out of the rescue range again, and a preset periodicity T2 for query within the longest waiting time. The optional information may be preset when the vehicle is delivered from a factory, or may be refreshed during subsequent version update, or may be separately pushed to the vehicle before each software upgrade. This is not limited herein.

Step 3: After obtaining the location of each service site and the rescue range in which each service site can provide a rescue service that are sent by the cloud server, the vehicle determines, based on the information and a current location of the vehicle, whether the vehicle is currently located within the rescue range. A manner in which the vehicle determines whether the vehicle is located within the rescue range may be the manner described in FIG. 4. Details are not described herein again.

Step 4: The vehicle reports a determining result and other auxiliary information (e.g., a current running version of the vehicle) to the cloud server. If the determining result received by the cloud server is that the vehicle is located within the rescue range, step 8 is performed. If the determining result received by the cloud server is that the vehicle is outside the rescue range, step 6 is performed.

Step 5: The cloud server determines, based on the other auxiliary information sent by the vehicle, whether there is currently a software version suitable for upgrading the vehicle, that is, determines whether an upgrade version is a full version, a differential version, or both of the full version and the differential version. If there is currently no upgrade version suitable for the vehicle on the cloud server, the process directly ends, or the vehicle is notified to perform a query after preset duration (e.g., two weeks later), or the vehicle is notified of time at which the software upgrade version is to be released. This is not limited herein. It should be noted that in some implementations of the present disclosure, step 5 may be performed before step 2 to step 4, or may be performed after step 2 to step 4. A specific execution sequence of step 5 is not limited herein.

Step 6: If the determining result received by the cloud server is that the vehicle is outside the rescue range, the cloud server is triggered to start timing (e.g., the cloud server is triggered to start a timer to start timing), so that the cloud server further determines whether duration for waiting for the vehicle to enter the rescue range exceeds first preset duration. If the waiting duration does not exceed the first preset duration, step 7 is performed. Before step 7 is performed, the vehicle may further first remind the user that "to-be-upgraded software needs to be downloaded, please drive to the rescue range" (that is, the reminder message in the foregoing embodiment). If the waiting duration exceeds the first preset duration, step 9 is performed.

Step 7: After notifying the vehicle of the waiting duration T1, the cloud server re-determines whether the vehicle is located within the rescue range (that is, returns to step 3 for re-determining), and sends a result of the determining to the cloud server again. T1 may be delivered by the cloud server to the vehicle in step 3, or may be delivered to the vehicle in step 7. Details are not described herein.

Step 8: If the determining result received by the cloud server is that the vehicle is located within the rescue range, the cloud server sends, to the vehicle, a to-be-upgraded installation package corresponding to a differential version of the software upgrade version.

Step 9: If the determining result received by the cloud server is that the vehicle is outside the rescue range, the cloud server sends, to the vehicle, a to-be-upgraded installation package corresponding to a full version.

Step 10: The vehicle determines whether a vehicle status is suitable for an upgrade reminder, that is, determines whether the vehicle meets an upgrade condition (e.g., whether the vehicle is in a driving state or whether a gear is met). If the vehicle is suitable for an upgrade reminder, step 11 is performed. If the vehicle is not suitable for an upgrade reminder, step 16 is performed.

Step 11: The vehicle re-determines, in a manner similar to that in step 3, whether the vehicle is still located within the rescue range. In some implementations, the vehicle may further send a determining result to the cloud server. Details are not described herein. If the determining result is that the vehicle is still located within the rescue range, step 14 is performed. If the determining result is that the vehicle is outside the rescue range, step 12 is performed.

Step 12: If the determining result is that the vehicle is outside the rescue range, the vehicle is triggered to start timing (e.g., the vehicle is triggered to start a timer to start timing), so that the vehicle further determines whether duration for waiting for the vehicle to enter the rescue range exceeds second preset duration. If the waiting duration does not exceed the second preset duration, step 15 is performed. If the waiting duration exceeds the second preset duration, step 16 is performed. In some implementations of the present disclosure, the vehicle may alternatively send the determining result to the cloud server. If the determining result received by the cloud server is that the vehicle is outside the rescue range, the cloud server is triggered to start timing (e.g., the cloud server is triggered to start a timer to start timing), so that the cloud server further determines whether duration for waiting for the vehicle to enter the rescue range exceeds second preset duration. If the waiting duration does not exceed the second preset duration, step 15 is performed. Before step 15 is performed, the user may be first reminded that "a software upgrade version needs to be installed, please drive to the rescue range". If the waiting duration exceeds the second preset duration, step 16 is performed.

Step 13: The vehicle outputs installation reminder information. The installation reminder information is used to remind the user that a new software upgrade version needs to be installed.

Step 14: The vehicle performs installation according to an instruction entered by the user, and reports a result to the cloud server after the installation is completed.

Step 15: Periodically determine whether the vehicle status meets an installation reminder requirement, or determine, under event triggering, whether the vehicle meets an installation reminder requirement (e.g., the user uses the P gear).

Step 16: The vehicle outputs installation reminder information, to remind the user to perform installation with caution.

In the foregoing implementations of the present disclosure, a vehicle OTA control method is described in more detail. It should be noted that the vehicle software upgrade method in FIG. 6A and FIG. 6B is merely an example of the foregoing implementations. In some implementations of the present disclosure, more or fewer steps may be included, and a sequence of steps may also be adjusted based on an actual situation. This is not specifically limited herein.

In embodiments of the present disclosure, the vehicle and the cloud server may be divided into function modules based on the example of the vehicle software upgrade method. For example, each function module may be obtained through division based on each corresponding function, or two or more functions may be integrated into one processing module. The integrated module may be implemented in a form of hardware, or may be implemented in a form of a software function module. It should be noted that, in embodiments of the present disclosure, module division is an example, and is merely a logical function division. In actual implementation, another division manner may be used.

Figure 7:
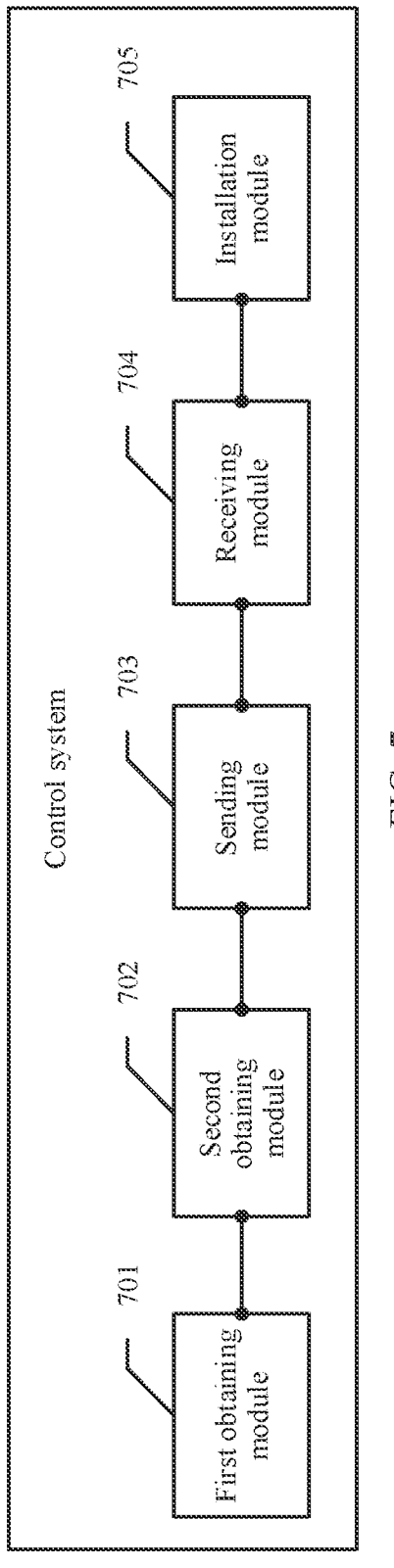
FIG. 7 is a schematic diagram of a control system applied in a vehicle according to an embodiment of the present disclosure.

For example, FIG. 7 shows a control system applied to a vehicle. The control system may include: a first obtaining module 701, a second obtaining module 702, a sending module 703, a receiving module 704, and an installation module 705. The first obtaining module 701 is configured to obtain a rescue range of a service site. The service site is one or more entity platforms for providing a rescue service for a vehicle whose software fails to be upgraded. The second obtaining module 702 is configured to obtain a current location of a target vehicle. The sending module 703 is configured to: when the current location of the target vehicle is within the rescue range, send information about to-be-upgraded software of the target vehicle to a cloud server. The information about the to-be-upgraded software is used to indicate to the cloud server to search for a to-be-upgraded installation package of the to-be-upgraded software based on the information about the to-be-upgraded software. The receiving module 704 is configured to receive the to-be-upgraded installation package found by the cloud server. The installation module 705 is configured to perform upgrade based on the to-be-upgraded installation package.

In a possible design, the sending module 703 is further configured to send, to the cloud server, the information about the to-be-upgraded software of the target vehicle and first information indicating that the target vehicle is located within the rescue range. The first information is used to indicate to the cloud server to select a to-be-upgraded installation package of a differential version type based on the first information.

In a possible design, the sending module 703 is further configured to: when the current location of the target vehicle is outside the rescue range, send, to the cloud server, the information about the to-be-upgraded software of the target vehicle and second information indicating that the target vehicle is outside the rescue range. The information about the to-be-upgraded software is used to indicate to the cloud server to search for the to-be-upgraded installation package of the to-be-upgraded software based on the information about the to-be-upgraded software, and the second information is used to indicate to the cloud server to select a to-be-upgraded installation package of a full version type based on the second information.

In a possible design, the sending module 703 is further configured to: when the current location of the target vehicle is outside the rescue range, periodically determine, within preset duration, whether the target vehicle has entered the rescue range, or obtain a reminder message, where the reminder message is used to remind the target vehicle to enter the rescue range within the preset duration; enter the rescue range within the preset duration; and send, to the cloud server, the information about the to-be-upgraded software of the target vehicle and third information indicating that the vehicle has entered the rescue range within the preset duration. The information about the to-be-upgraded software is used to indicate to the cloud server to search for the to-be-upgraded installation package of the to-be-upgraded software based on the information about the to-be-upgraded software. The third information is used to indicate to the cloud server to select a to-be-upgraded installation package of a differential version type based on the third information.

In a possible design, the second obtaining module 702 is further configured to obtain a notification message. The notification message is used to indicate to the target vehicle to periodically determine, within the preset duration, whether the target vehicle has entered the rescue range, and the notification message is generated by the target vehicle or received from the cloud server.

In a possible design, the sending module 703 is further configured to: generate the reminder message; or receive the reminder message sent by the cloud server.

In a possible design, the first obtaining module 701 is further configured to: send a request message to the cloud server, where the request message is used to indicate to the cloud server to send the rescue range of the service site to the target vehicle; and receive the rescue range of the service site that is sent by the cloud server.

In a possible design, the first obtaining module 701 is further configured to obtain the rescue range of the service site from a storage device of the target vehicle.

In a possible design, the first obtaining module 701 is further configured to: obtain a location of the service site and a maximum rescue distance of the service site; and determine the rescue range of the service site based on the location of the service site and the maximum rescue distance of the service site.

In a possible design, the installation module 705 is further configured to: output installation reminder information when the target vehicle meets an upgrade condition, where the installation reminder information is used to indicate to enter an instruction to the target vehicle; and upgrade the to-be-upgraded installation package according to the instruction.

It should be noted that content such as information exchange and an execution process between the modules/units in the control system is based on a same concept as the method embodiments corresponding to FIG. 2, FIG. 4, FIG. 5, and FIG. 6A and FIG. 6B in the present disclosure, to be specific, a specific function and structure of the control system in the embodiment corresponding to FIG. 7 are used to implement the processing steps performed by the vehicle in FIG. 2, FIG. 4, FIG. 5, and FIG. 6A and FIG. 6B. For specific content, refer to the descriptions in the foregoing method embodiments of the present disclosure. Details are not described herein again.

An embodiment of the present disclosure further provides a cloud server. The cloud server may include: an obtaining module 801, a first sending module 802, a receiving module 803, and a second sending module 804. The obtaining module 801 is configured to obtain a request message sent by a target vehicle. The request message is used to indicate to the cloud server to send a rescue range of a service site to the target vehicle. The service site is one or more entity platforms for providing a rescue service for a vehicle whose software fails to be upgraded. The first sending module 802 is configured to send the rescue range of the service site to the target vehicle, so that the target vehicle determines whether a current location of the target vehicle is within the rescue range. The receiving module 803 is configured to receive information that is about to-be-upgraded software of the target vehicle and that is sent by the target vehicle. The information about the to-be-upgraded software is sent by the target vehicle when the current location of the target vehicle is within the rescue range. The information about the to-be-upgraded software is used to indicate to the cloud server to search for a to-be-upgraded installation package of the to-be-upgraded software based on the information about the to-be-upgraded software. The second sending module 804 is configured to: find the to-be-upgraded installation package, and send the to-be-upgraded installation package to the target vehicle, so that the target vehicle performs upgrade based on the to-be-upgraded installation package.

In a possible design, the receiving module 803 is further configured to receive the information about the to-be-upgraded software of the target vehicle and first information indicating that the target vehicle is located within the rescue range that are sent by the target vehicle. The first information is used to indicate to the cloud server to select a to-be-upgraded installation package of a differential version type based on the first information.

In a possible design, the receiving module 803 is further configured to receive the information about the to-be-upgraded software of the target vehicle and second information indicating that the target vehicle is outside the rescue range that are sent by the target vehicle. The information about the to-be-upgraded software is sent by the target vehicle when the target vehicle is outside the rescue range. The information about the to-be-upgraded software is used to indicate to the cloud server to search for the to-be-upgraded installation package of the to-be-upgraded software based on the information about the to-be-upgraded software. The second information is used to indicate to the cloud server to select a to-be-upgraded installation package of a full version type based on the second information.

In a possible design, the receiving module 803 is further configured to receive the information about the to-be-upgraded software of the target vehicle and third information indicating that the target vehicle has entered the rescue range within preset duration that are sent by the target vehicle. The information about the to-be-upgraded software is sent by the target vehicle when the target vehicle enters the rescue range within the preset duration. The information about the to-be-upgraded software is used to indicate to the cloud server to search for the to-be-upgraded installation package of the to-be-upgraded software based on the information about the to-be-upgraded software. The third information is used to indicate to the cloud server to select a to-be-upgraded installation package of a differential version type based on the third information.

In a possible design, the first sending module 802 is further configured to: send a notification message or a reminder message to the target vehicle. The notification message is used to indicate to the target vehicle to periodically determine, within the preset duration, whether target vehicle has entered the rescue range, and the reminder message is used to indicate to the target vehicle to enter the rescue range within the preset duration.

In a possible design, the first sending module 802 is further configured to: send a location of the service site and a maximum rescue distance of the service site to the target vehicle, so that the target vehicle determines the rescue range of the service site based on the location of the service site and the maximum rescue distance of the service site; or obtain a location of the service site and a maximum rescue distance of the service site; and determine the rescue range of the service site based on the location of the service site and the maximum rescue distance of the service site, and send the rescue range of the service site to the target vehicle.

Figure 8:
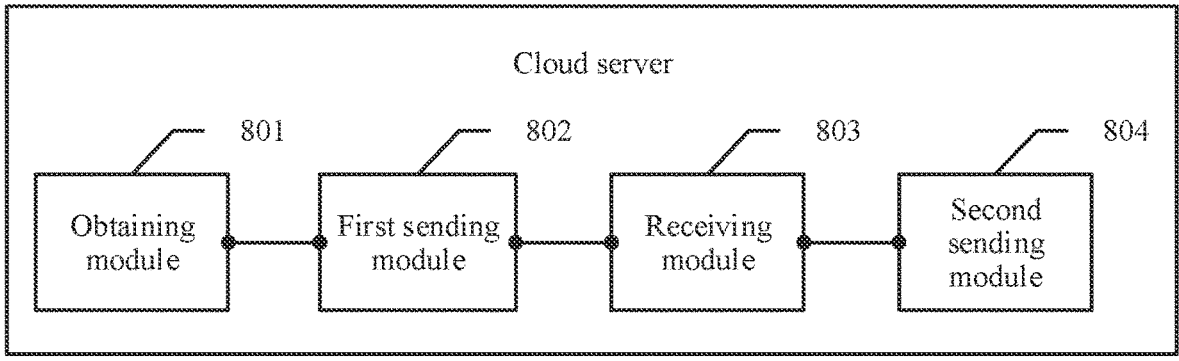
FIG. 8 is a schematic diagram of a cloud server according to an embodiment of the present disclosure.

It should be noted that content such as information exchange and an execution process between the modules/units in the cloud server is based on a same concept as the method embodiments corresponding to FIG. 2, FIG. 4, FIG. 5, and FIG. 6A and FIG. 6B in the present disclosure, to be specific, a specific function and structure of the cloud server in the embodiment corresponding to FIG. 8 are used to implement the processing steps performed by the cloud server in FIG. 2, FIG. 4, FIG. 5, and FIG. 6A and FIG. 6B. For specific content, refer to the descriptions in the foregoing method embodiments of the present disclosure. Details are not described herein again.

Figure 9:
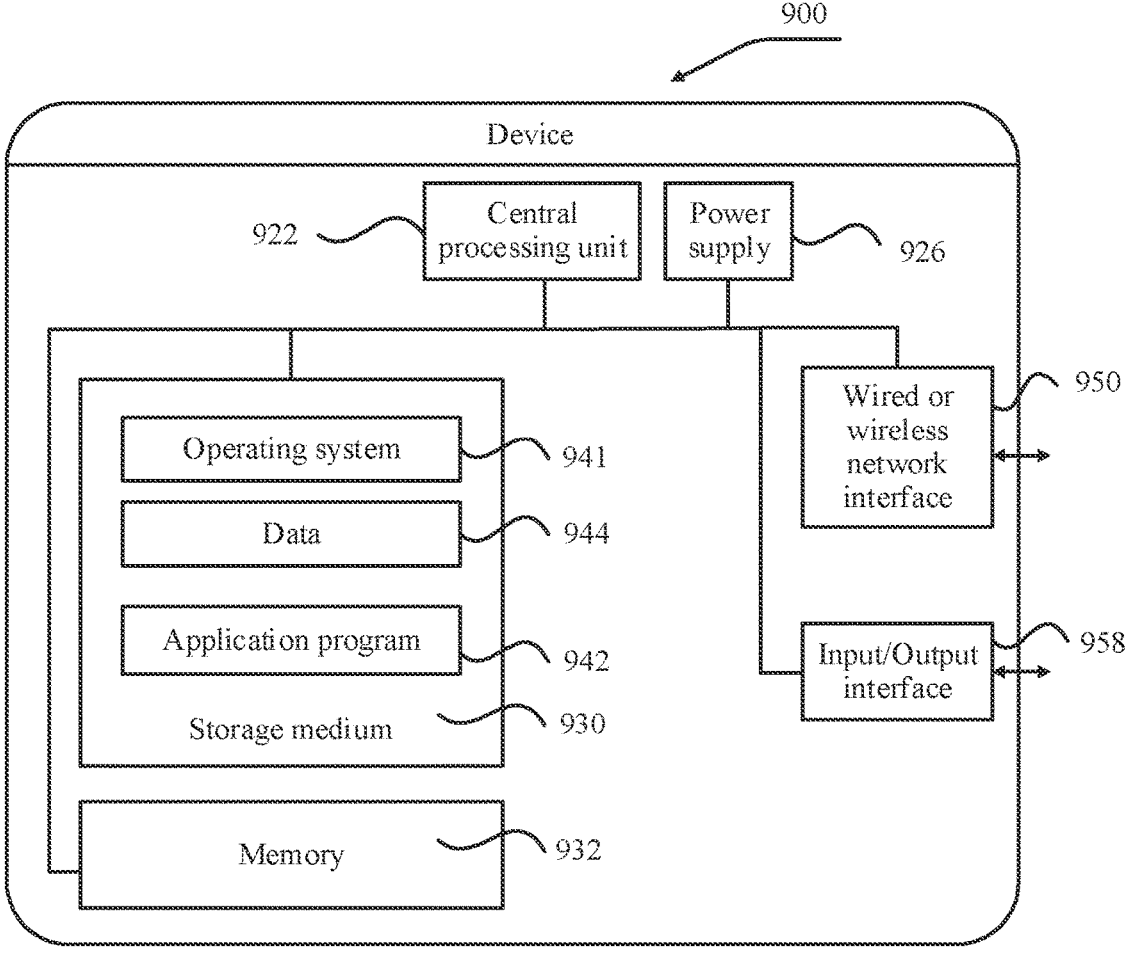
FIG. 9 is a schematic diagram of a related device according to an embodiment of the present disclosure.

An embodiment of the present disclosure further provides a related device. The device may be a control system in a vehicle, or may be a cloud server. FIG. 9 is a schematic diagram of a structure of a related device according to an embodiment of the present disclosure. When the device is a control system in a vehicle, a corresponding module of the control system described in the embodiment corresponding to FIG. 7 may be deployed on the device 900, to implement a function of the control system in the embodiment corresponding to FIG. 7. When the device is a cloud server, a corresponding module of the cloud server described in the embodiment corresponding to FIG. 8 may be deployed on the device 900, to implement a function of the cloud server in the embodiment corresponding to FIG. 8.

In an embodiment, the device 900 is implemented by one or more servers. The device 900 may vary greatly due to different configurations or performance, and may include one or more central processing units (CPU) 922 (e.g., one or more processors) and a memory 932, and one or more storage media 930 (e.g., one or more mass storage devices) that store an application program 942 or data 944. The memory 932 and the storage medium 930 may be transient storage or persistent storage. The program stored in the storage medium 930 may include one or more modules (not shown in the figure), and each module may include a series of instruction operations for the device (e.g., a control system or a cloud server). Further, the central processing unit 922 may be configured to communicate with the storage medium 930, and perform, on the device 900, the series of instruction operations in the storage medium 930.

The device 900 may further include one or more power supplies 926, one or more wired or wireless network interfaces 950, one or more input/output interfaces 958, and/or one or more operating systems 941, such as Windows Server™, Mac OS X™, Unix™, Linux™, and FreeB SD™.

It should be noted that, in this embodiment of the present disclosure, if the device 900 is used as a vehicle control system, the central processing unit 922 is configured to perform the steps performed by the vehicle in the embodiments corresponding to FIG. 2, FIG. 4, FIG. 5, and FIG. 6A and FIG. 6B. For example, the central processing unit 922 is configured to: send a software upgrade request to the cloud server, and obtain a rescue range of a service site. The service site is one or more entity platforms for providing a rescue service for a vehicle whose software fails to be upgraded. Then, the central processing unit 922 determines, based on a current location of the vehicle, whether the vehicle is located within the rescue range, and sends a determining result to the cloud server, so that the cloud server determines, based on the determining result, an installation package type corresponding to to-be-upgraded software. The to-be-upgraded software is determined by the cloud server based on the software upgrade request. If the determining result is that the vehicle is located within the rescue range, the central processing unit 922 obtains a to-be-upgraded installation package that is corresponding to a differential version of the to-be-upgraded software and that is sent by the cloud server, and finally performs version upgrade based on the to-be-upgraded installation package corresponding to the differential version.

It should be further noted that, in this embodiment of the present disclosure, if the device 900 is used as the cloud server, the central processing unit 922 is configured to perform the steps performed by the cloud server in the embodiments corresponding to FIG. 2, FIG. 4, FIG. 5, and FIG. 6A and FIG. 6B. For example, the central processing unit 922 is configured to: obtain a software upgrade request sent by a vehicle, and determine a software upgrade version based on the software upgrade request. Then, the central processing unit 922 sends a rescue range of a service site to the vehicle, so that the vehicle determines, based on a current location of the vehicle, whether the vehicle is located within the rescue range. The service site is one or more entity platforms that can provide a rescue service for a vehicle whose software fails to be upgraded. Then, the central processing unit 922 obtains a determining result sent by the vehicle, and determines, based on the determining result, an installation package type corresponding to the to-be-upgraded software. If the determining result is that the vehicle is located within the rescue range, the central processing unit 922 sends, to the vehicle, a to-be-upgraded installation package corresponding to a differential version of the to-be-upgraded software, so that the vehicle performs version upgrade based on the to-be-upgraded installation package corresponding to the differential version.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected based on actual needs to achieve the objectives of the solutions of embodiments. In addition, in the accompanying drawings of the apparatus embodiments provided in the present disclosure, connection relationships between modules indicate that the modules have communication connections with each other, which may be specifically implemented as one or more communication buses or signal cables.

Based on the description of the foregoing implementations, a person skilled in the art may clearly understand that the present disclosure may be implemented by software in addition to universal hardware, or by dedicated hardware, including a dedicated integrated circuit, a dedicated CPU, a dedicated memory, a dedicated component, and the like. Generally, any function that can be performed by a computer program can be easily implemented by using corresponding hardware. Moreover, a specific hardware structure used to achieve a same function may be in various forms, for example, in a form of an analog circuit, a digital circuit, or a dedicated circuit. However, as for the present disclosure, software program implementation is a better implementation in most cases. Based on such an understanding, the technical solutions of the present disclosure essentially or the part contributing to the conventional technology may be implemented in a form of a software product. The computer software product is stored in a readable storage medium, for example, a floppy disk, a Universal Serial Bus (USB) flash drive, a removable hard disk, a read-only memory (ROM), a random-access memory (RAM), a magnetic disk, or an optical disc of a computer, and includes several instructions for instructing a computer device (which may be a personal computer, a training device, or a network device) to perform the methods described in embodiments of the present disclosure.

All or some of the foregoing embodiments may be implemented by using software, hardware, firmware, or any combination thereof. When software is used to implement embodiments, all or a part of the embodiments may be implemented in a form of a computer program product.

The computer program product includes one or more computer instructions. When the computer program instructions are loaded and executed on the computer, the procedure or functions according to embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, training device, or data center to another website, computer, training device, or data center in a wired (e.g., a coaxial cable, an optical fiber, or a digital subscriber line (DSL)) or wireless (e.g., infrared, radio, or microwave) manner. The computer-readable storage medium may be any usable medium accessible by a computer, or a data storage device, for example, a training device or a data center, integrating one or more usable media. The usable medium may be a magnetic medium (e.g., a floppy disk, a hard disk, or a magnetic tape), an optical medium (e.g., a digital video disc (DVD)), a semiconductor medium (e.g., a solid-state drive (SSD)), or the like.

What is claimed is:

1. A method comprising:
obtaining a rescue range of a service site, wherein the service site comprises one or more entity platforms for providing a rescue service for a vehicle whose software fails to be upgraded;
obtaining a current location of a target vehicle;
determining whether the current location of the target vehicle is within the rescue range;
determining information about a to-be-upgraded software of the target vehicle based on whether the current location of the target vehicle is within the rescue range, wherein the information indicates that a to-be-upgraded installation package is a differential version type of the to-be-upgraded installation package when the current location of the target vehicle is determined to be within the rescue range, and wherein the information indicates that the to-be-upgraded installation package is a full version type as the to-be-upgraded installation package when the current location of the target vehicle is determined to be outside the rescue range;
sending the information about the to-be-upgraded software of the target vehicle to a cloud server, wherein the information instructs the cloud server to search for the to-be-upgraded installation package of the to-be-upgraded software based on the information;
receiving the to-be-upgraded installation package from the cloud server; and
performing an upgrade based on the to-be-upgraded installation package.

2. The method according to claim 1, further comprising obtaining a reminder message when the current location of the target vehicle is outside the rescue range, wherein the reminder message is used to remind the target vehicle to enter the rescue range within a preset duration.

3. The method according to claim 2, wherein obtaining the reminder message comprises generating, by the target vehicle, the reminder message.

4. The method according to claim 2, wherein obtaining the reminder message comprises receiving the reminder message from the cloud server.

5. The method according to claim 1, further comprising periodically determining, within a preset duration, whether the target vehicle has entered the rescue range when the current location of the target vehicle is outside the rescue range.

6. The method according to claim 5, further comprising obtaining a notification message to initiate the periodically determining, within the preset duration, whether the target vehicle has entered the rescue range, wherein the notification message is generated by the target vehicle or received from the cloud server.

7. The method according to claim 1, wherein obtaining the rescue range of the service site comprises obtaining a location of the service site and a maximum rescue distance of the service site.

8. A system comprising:
a memory configured to store instructions; and
a processor coupled to the memory and configured to execute the instructions to cause the system to:
   obtain a rescue range of a service site, wherein the service site comprises one or more entity platforms for providing a rescue service for a vehicle whose software fails to be upgraded;
   obtain a current location of a target vehicle;
   determine whether the current location of the target vehicle is within the rescue range;
   determine information about a to-be-upgraded software of the target vehicle based on whether the current location of the target vehicle is within the rescue range, wherein the information indicates that a to-be-upgraded installation package is a differential version type of the to-be-upgraded installation package when the current location of the target vehicle is determined to be within the rescue range, and wherein the information indicates that the to-be-upgraded installation package is a full version type as the to-be-upgraded installation package when the current location of the target vehicle is determined to be outside the rescue range;
   send the information about the to-be-upgraded software of the target vehicle to a cloud server, wherein the information instructs the cloud server to search for the to-be-upgraded installation package of the to-be-upgraded software based on the information;
   receive the to-be-upgraded installation package from the cloud server; and
   perform an upgrade based on the to-be-upgraded installation package.

9. The system according to claim 8, wherein the processor is further configured to execute the instructions to cause the system to obtain a reminder message when the current location of the target vehicle is outside the rescue range, wherein the reminder message is used to remind the target vehicle to enter the rescue range within a preset duration.

10. The system according to claim 9, wherein the processor is further configured to execute the instructions to cause the system to obtain the reminder message by generating the reminder message.

11. The system according to claim 9, wherein the processor is further configured to execute the instructions to cause the system to obtain the reminder message by receiving the reminder message from the cloud server.

12. The system according to claim 8, wherein the processor is further configured to execute the instructions to cause the system to periodically determine, within a preset duration, whether the target vehicle has entered the rescue range when the current location of the target vehicle is outside the rescue range.

13. The system according to claim 12, wherein the processor is further configured to execute the instructions to cause the system to obtain a notification message to initiate the periodically determine, within the preset duration, whether the target vehicle has entered the rescue range, wherein the notification message is generated by the target vehicle or received from the cloud server.

14. The system according to claim 8, wherein the processor is further configured to execute the instructions to cause the system to:
   send, to the cloud server, a request message to send the rescue range of the service site to the target vehicle; and
   receive the rescue range of the service site from the cloud server.

15. A computer program product comprising a non-transitory computer-readable storage medium storing instructions that when executed by one or more processors of an apparatus, cause the apparatus to:
   obtain a rescue range of a service site, wherein the service site comprises one or more entity platforms for providing a rescue service for a vehicle whose software fails to be upgraded;
   obtain a current location of a target vehicle;
   determine whether the current location of the target vehicle is within the rescue range;
   determine information about a to-be-upgraded software of the target vehicle based on whether the current location of the target vehicle is within the rescue range, wherein the information indicates that a to-be-upgraded installation package is a differential version type of the to-be-upgraded installation package when the current location of the target vehicle is determined to be within the rescue range, and wherein the information indicates that the to-be-upgraded installation package is a full version type as the to-be-upgraded installation package when the current location of the target vehicle is determined to be outside the rescue range;
   send the information about the to-be-upgraded software of the target vehicle to a cloud server, wherein the information instructs the cloud server to search for the to-be-upgraded installation package of the to-be-upgraded software based on the information;
   receive the to-be-upgraded installation package from the cloud server; and
   perform an upgrade based on the to-be-upgraded installation package.

16. The computer program product according to claim 15, wherein the one or more processors are further configured to execute the instructions to cause the apparatus to obtain a reminder message when the current location of the target vehicle is outside the rescue range, wherein the reminder message is used to remind the target vehicle to enter the rescue range within a preset duration.

17. The computer program product according to claim 16, wherein the one or more processors are further configured to execute the instructions to cause the apparatus to obtain the reminder message by generating the reminder message.

18. The computer program product according to claim 16, wherein the one or more processors are further configured to execute the instructions to cause the apparatus to obtain the reminder message by receiving the reminder message from the cloud server.

19. The computer program product according to claim 15, wherein the one or more processors are further configured to execute the instructions to cause the apparatus to periodically determine, within a preset duration, whether the target vehicle has entered the rescue range when the current location of the target vehicle is outside the rescue range.

20. The computer program product according to claim 19, wherein the one or more processors are further configured to execute the instructions to cause the apparatus to obtain a notification message to initiate the periodically determine, within the preset duration, whether the target vehicle has entered the rescue range, wherein the notification message is generated by the target vehicle or received from the cloud server.

\* \* \* \* \*